US011322780B2

(12) United States Patent
Sakata et al.

(10) Patent No.: US 11,322,780 B2
(45) Date of Patent: May 3, 2022

(54) ELECTROLYTE SOLUTION, ELECTROCHEMICAL DEVICE, SECONDARY BATTERY, AND MODULE

(71) Applicant: DAIKIN INDUSTRIES, LTD., Osaka (JP)

(72) Inventors: Hideo Sakata, Osaka (JP); Kenzou Takahashi, Osaka (JP); Hiroyuki Arima, Osaka (JP); Shigeaki Yamazaki, Osaka (JP); Shinichi Kinoshita, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 315 days.

(21) Appl. No.: 16/319,135

(22) PCT Filed: Jun. 16, 2017

(86) PCT No.: PCT/JP2017/022251
§ 371 (c)(1),
(2) Date: Jan. 18, 2019

(87) PCT Pub. No.: WO2018/016246
PCT Pub. Date: Jan. 25, 2018

(65) Prior Publication Data
US 2019/0288339 A1  Sep. 19, 2019

(30) Foreign Application Priority Data
Jul. 22, 2016  (JP) ................................ 2016-144390

(51) Int. Cl.
| H01M 10/0568 | (2010.01) |
| H01M 10/0525 | (2010.01) |
| H01M 10/0567 | (2010.01) |
| H01M 10/0569 | (2010.01) |
| H01G 11/60 | (2013.01) |
| H01G 11/62 | (2013.01) |
| H01G 11/64 | (2013.01) |
| H01M 10/052 | (2010.01) |
| H01G 9/20 | (2006.01) |

(52) U.S. Cl.
CPC .......... *H01M 10/0568* (2013.01); *H01G 9/20* (2013.01); *H01G 11/60* (2013.01); *H01G 11/62* (2013.01); *H01G 11/64* (2013.01); *H01M 10/052* (2013.01); *H01M 10/0525* (2013.01); *H01M 10/0567* (2013.01); *H01M 10/0569* (2013.01); *H01M 2300/0034* (2013.01); *H01M 2300/0037* (2013.01)

(58) Field of Classification Search
CPC ......... H01M 10/0568; H01M 10/0525; H01M 10/0567; H01M 10/0569; H01M 2300/0034; H01M 2300/0037
See application file for complete search history.

(56) References Cited

U.S. PATENT DOCUMENTS

| 6,379,846 B1 | 4/2002 | Terahara et al. |
| 2005/0221195 A1 | 10/2005 | Uchida et al. |
| 2009/0253044 A1 | 10/2009 | Nogi et al. |
| 2011/0136018 A1 | 6/2011 | Nogi et al. |
| 2014/0011081 A1 | 1/2014 | Ahn et al. |
| 2014/0023938 A1 | 1/2014 | Sakata et al. |
| 2015/0099193 A1 | 4/2015 | Hamasaki et al. |
| 2015/0140361 A1 | 5/2015 | Abe et al. |
| 2015/0140448 A1* | 5/2015 | Takiguchi ......... H01M 10/0525 429/332 |
| 2015/0340736 A1 | 11/2015 | Kim et al. |
| 2016/0027592 A1 | 1/2016 | Shimamoto et al. |
| 2017/0025708 A1 | 1/2017 | Yamazaki et al. |
| 2017/0200974 A1 | 7/2017 | Maruo et al. |
| 2017/0222264 A1 | 8/2017 | Morinaka et al. |
| 2019/0214682 A1 | 7/2019 | Sakata et al. |

FOREIGN PATENT DOCUMENTS

| JP | 2000-208169 A | 7/2000 |
| JP | 2004-087459 A | 3/2004 |
| JP | 4538886 B2 | 9/2010 |

(Continued)

OTHER PUBLICATIONS

Machine Translation of JP 2016-186910 A (of record).
International Preliminary Report on Patentability with the translation of Written Opinion dated Jan. 22, 2019 issued by the International Bureau in International Application No. PCT/JP2017/022243.
International Preliminary Report on Patentability with the translation of Written Opinion dated Jan. 22, 2019 issued by the International Bureau in International Application No. PCT/JP2017/022251.
International Search Report for PCT/JP2017/022251 dated Aug. 15, 2017 [PCT/ISA/210].
International Search Report for PCT/JP2017/022243 dated Aug. 15, 2017 [PCT/ISA/210].
Partial Supplementary European Search Report dated Feb. 10, 2020 from European Patent Office in Application No. 17830765.8.
Partial Supplementary European Search Report dated Feb. 17, 2020 from European Patent Office in Application No. 17830766.6.
Extended European Search Report dated Jun. 4, 2020, from the European Patent Office in Application No. 17830766.6.
Extended European Search Report dated Jun. 5, 2020, from the European Patent Office in Application No. 17830765.8.

(Continued)

*Primary Examiner* — Stewart A Fraser
(74) *Attorney, Agent, or Firm* — Sughrue Mion, PLLC

(57) ABSTRACT

An electrolyte solution for an electrochemical device, such as a lithium secondary battery, or module. The electrolyte solution contains: a solvent that contains a fluorinated acyclic carbonate having a fluorine content of 33 to 70 mass %; at least one organosilicon compound selected from a compound represented by the formula (1): $(R^{11})_{n11}$—$M^{11}$—O—$SiR^{12}R^{13}R^{14}$ and a compound represented by the formula (2): $R^{21}R^{22}R^{23}$—Si—F; a lithium salt (3) that contains an oxalato-complex as an anion; and a lithium salt (4) represented by the formula (4): $Li_zM^{31}F_xO_y$, where $R^{11}$, $M^{11}$, $R^{12}$, $R^{13}$, $R^{14}$, $R^{21}$, $R^{22}$, $R^{23}$ and $M^{31}$ are as defined herein.

9 Claims, No Drawings

(56) References Cited

FOREIGN PATENT DOCUMENTS

| | | |
|---|---|---|
| JP | 4568920 B2 | 10/2010 |
| JP | 2013-55074 A | 3/2013 |
| JP | 5274563 B2 | 8/2013 |
| JP | 5549438 B2 | 7/2014 |
| JP | 2014-526125 A | 10/2014 |
| JP | 2015-072856 A | 4/2015 |
| JP | 2015-072863 A | 4/2015 |
| JP | 2015-76403 A | 4/2015 |
| JP | 2016-35820 A | 3/2016 |
| JP | 2016-186910 A | 10/2016 |
| KR | 10-2016-0002313 A | 1/2016 |
| WO | 2014/163055 A1 | 10/2014 |
| WO | 2015/083747 A1 | 6/2015 |
| WO | 2015/147005 A1 | 10/2015 |
| WO | 2016/009923 A1 | 1/2016 |

OTHER PUBLICATIONS

Non-Final Office Action dated Aug. 31, 2020 issued in U.S. Appl. No. 16/319,060.
Communication dated Jan. 12, 2021, from the United States Patent and Trademark Office in U.S. Appl. No. 16/319,060.
Extended European Search Report dated Jun. 14, 2021 from the European Patent Office in related EP divisional Application No. 21159886.7.
Final Office Action dated Sep. 9, 2021 in related U.S. Appl. No. 16/319,060.
Office Action dated Jun. 1, 2021 in related U.S. Appl. No. 16/319,060.
Non-Final Office Action dated Dec. 17, 2021 issued in U.S. Appl. No. 16/319,060.
Machine Translation of WO 2016/009923 A1.

* cited by examiner

ELECTROLYTE SOLUTION, ELECTROCHEMICAL DEVICE, SECONDARY BATTERY, AND MODULE

CROSS REFERENCE TO RELATED APPLICATIONS

This application is a National Stage of International Application No. PCT/JP2017/022251 filed Jun. 16, 2017, claiming priority based on Japanese Patent Application No. 2016-144390 filed Jul. 22, 2016.

TECHNICAL FIELD

The invention relates to electrolyte solutions, electrochemical devices, secondary batteries, and modules.

BACKGROUND ART

Current electric appliances demonstrate a tendency to have a reduced weight and a smaller size, which leads to development of lithium ion secondary batteries having a high energy density. Further, lithium ion secondary batteries are used in more various fields, and thus are desired to have improved battery performance. The battery performance of lithium ion secondary batteries will become a more and more important factor particularly when the batteries are put in use for automobiles.

Patent Literature 1 discloses a non-aqueous electrolyte solution containing a non-aqueous solvent and a lithium electrolyte, wherein the non-aqueous solvent contains a phosphoric acid compound selected from tris(trimethylsilyl) phosphate, bis(trimethylsilyl)methyl phosphate, dimethyl trimethylsilyl phosphate, and diethyl trimethylsilyl phosphate in an amount of 0.01 to 40 vol % with the amount of the whole non-aqueous electrolyte solution taken as 100 vol %.

Patent Literature 2 discloses a mixed-type non-aqueous electrolyte solution for lithium ion secondary batteries with a low initial battery resistance. This non-aqueous electrolyte solution for lithium ion secondary batteries contains 0.01 mass % to 15 mass % of an organosilicon compound represented by the following formula [1] and 0.1 moles/liter to 3 moles/liter of a fluorine-containing alkali metal salt which serves as an electrolyte, wherein the content of a fluorinated organosilicon compound generated by reaction of the organosilicon compound and the fluorine-containing alkali metal salt is 0.2 mass % or less,

[Chem. 1]

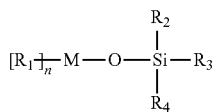

[1]

wherein M represents a metal atom, a phosphorus atom, a boron atom, or P=O; $R_1$ represents an alkyloxy group having 1 to 11 carbon atoms, a silyloxy group, or an alkylsilyloxy group having 1 to 11 carbon atoms; a represents the number of $R_1$ that are bonded to M, and is equal to the oxidation number of M minus 1 or the oxidation number of M minus 3; when n is 2 or greater, the two or more of $R_1$s may be the same or different from each other; and $R_2$ to $R_4$ each independently represent an alkyl group having 1 to 11 carbon atoms, an alkenyl group having 1 to 11 carbon atoms, an alkyloxy group having 1 to 11 carbon atoms, or an aryl group having 6 to 11 carbon atoms.

Patent Literature 3 discloses a non-aqueous electrolyte solution to be used for non-aqueous electrolyte solution secondary batteries including negative and positive electrodes capable of occluding and releasing metal ions and a non-aqueous electrolyte solution. This non-aqueous electrolyte solution contains: an electrolyte; a non-aqueous solvent; at least one compound (hereinafter, referred to as "compound A") selected from the group consisting of a phosphoric acid compound obtained by replacing at least one hydrogen atom of phosphoric acid by a group represented by the following formula (1), a phosphorous acid compound obtained by replacing at least one hydrogen atom of phosphorous acid by a group represented by the following formula (1), a boric acid compound obtained by replacing at least one hydrogen atom of boric acid by a group represented by the following formula (1), a sulfuric acid compound obtained by replacing at least one hydrogen atom of sulfuric acid by a group represented by the following formula (1), and a dicarboxylic acid compound obtained by replacing at least one hydrogen atom of dicarboxylic acid by a group represented by the following formula (1) in a proportion of 0.01 wt % or more and 10 wt % or less of the whole non-aqueous electrolyte solution; and at least one selected from the group consisting of monofluorophosphoric acid salts and difluorophosphoric acid salts, with the sum of the amounts of the monofluorophosphoric acid salts and the difluorophosphoric acid salts being 0.01 wt % or more and 10 wt % or less of the whole non-aqueous electrolyte solution. The formula (1) is as follows:

[Chem. 2]

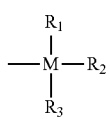

(1)

wherein M is a Si atom when the compound A is a phosphoric acid compound obtained by replacing at least one hydrogen atom of phosphoric acid by a group represented by the formula (1), or is a Si atom or a carbon atom when the compound A is at least one selected from the group consisting of a phosphorous acid compound obtained by replacing at least one hydrogen atom of phosphorous acid by a group represented by the formula (1), a boric acid compound obtained by replacing at least one hydrogen atom of boric acid by a group represented by the formula (1), a sulfuric acid compound obtained by replacing at least one hydrogen atom of sulfuric acid by a group represented by the formula (1), and a dicarboxylic acid compound obtained by replacing at least one hydrogen atom of dicarboxylic acid by a group represented by the formula (1); and $R_1$ to $R_3$ are each individually a hydrogen atom, a halogen atom, or a C1-C10 hydrocarbon group optionally containing a halogen atom.

Patent Literature 4 discloses a non-aqueous electrolyte solution containing: an additive for an electrolyte solution containing a lithium salt having an oxalato-complex as an anion and a compound represented by the following formula (1):

[Chem. 3]

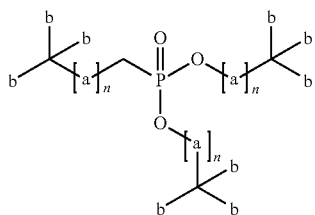

(wherein a is C or Si; b is H or F; and n is 1 to 5); a non-aqueous organic solvent; and a lithium salt.

Patent literature 5 discloses an electrolyte solution containing a solvent that contains a fluorinated acyclic carbonate having a fluorine content of 33 to 70 mass %, a borate, and an electrolyte salt other than the borate.

Patent Literature 6 discloses a non-aqueous electrolyte solution containing a fluorine-containing carbonate compound; a silicon-containing compound obtained by replacing one or more hydrogen atoms of one or more compounds selected from the group consisting of inorganic acids, organic acids, acid amides, and amines by a silicon-containing functional group; and a lithium salt.

Patent Literature 7 discloses a non-aqueous electrolyte solution for non-aqueous electrolyte solution secondary batteries including a positive electrode, a negative electrode containing a material capable of occluding and releasing lithium, and a non-aqueous electrolyte solution containing a non-aqueous solvent and a lithium salt. This non-aqueous electrolyte solution contains a silicon compound represented by the following formula (1)

[Chem. 4]

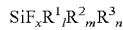 formula (1)

wherein $R^1$ to $R^3$ are the same as or different from each other, and are each a C1-C12 organic group; x is 1 to 3; and 1, m, and n are each 0 to 3 with $1 \leq (l+m+n) \leq 3$.

CITATION LIST

Patent Literature

Patent Literature 1: JP 4538886 B
Patent Literature 2: JP 5274563 B
Patent Literature 3: JP 5549438 B
Patent Literature 4: JP 2014-526125 T
Patent. Literature 5: WO 2015/147005
Patent Literature 6: JP 2015-72863 A
Patent Literature 7: JP 2004-87459 A

SUMMARY OF INVENTION

Technical Problem

The invention provides an electrolyte solution that can provide an electrochemical device such as a lithium secondary battery or a module having a small IV resistance value (internal resistance) and excellent high-temperature storage performance.

The invention also provides an electrochemical device such as a lithium secondary battery or a module having a small IV resistance value (internal resistance) and excellent high-temperature storage performance.

Solution to Problem

The inventors found that the use of a very limited type of a fluorinated acyclic carbonate as an acyclic carbonate with a specific organosilicon compound and specific lithium salts can lead to an electrochemical device such as a lithium secondary battery or a module having a small IV resistance value (internal resistance) and excellent high-temperature storage performance, thereby completing the invention.

Specifically, the invention relates to an electrolyte solution including: a solvent that contains a fluorinated acyclic carbonate having a fluorine content of 33 to 70 mass % at least one organosilicon compound. selected from the group consisting of a compound represented by the following formula (1) and a compound represented by the following formula (2); a lithium salt (3) that contains an oxalato-complex as an anion, and a lithium salt (4) represented by the following formula (4).

The formula (1) is as follows:

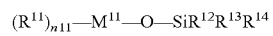

wherein $M^{11}$ is a metal atom, P, B, or P=O; $R^{11}$ is a C1-C11 alkyloxy group, a silyloxy group, or a C1-C11 alkylsilyloxy group; $n^{11}$ is the number of $R^{11}$s binding to $M^{11}$, and is the oxidation number of $M^{11}$ minus 1 or the oxidation number of $M^{11}$ minus 3; when $n^{11}$ is 2 or greater, $R^{11}$s are the same as or different from each other; $R^{12}$ to $R^4$ are the same as or different from each other, and are each a C1-C11 alkyl group, a C2-C11 alkenyl group, a C1-C11 alkyloxy group, or a C6-C11 aryl group.

The formula (2) is as follows:

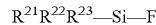

wherein $R^{21}$ to $R^{23}$ are the same as or different from each other, and are each a C1-C11 alkyl group, a C2-C11 alkenyl group, a C1-C11 alkyloxy group, or a C6-C11 aryl group.

The formula (4) is as follows:

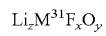

wherein $M^{31}$ is B, As, or Sb; x, y, and z are each an integer of 1 or greater with $z=7-(2y+x)$, z is 1 or 2, and y is an integer of 3 or smaller.

The lithium salt (3) is preferably at least one selected from the group consisting of a bis(oxalato)borate, a difluoro(oxalato)borate, a tris(oxalato)phosphate, a difluoro (bisoxalato) phosphate, and a tetrafluoro(oxalato)phosphate.

The lithium salt (4) is preferably at least one selected from the group consisting of $LiPO_2F_2$, $Li_2P^0{}_3F_f$ $LiAsO_2F_2$, $Li_2AsO_3F$, $LiSbO_2F_2$, and $Li_2SbO_3F$.

The electrolyte solution preferably contains 5 to 85 vol % of the fluorinated acyclic carbonate relative to the solvent.

The solvent preferably further contains a fluorinated saturated cyclic carbonate.

The electrolyte solution preferably contains 15 to 95 vol % of the fluorinated. saturated cyclic carbonate relative to the solvent.

The electrolyte solution preferably contains 40 to 100 vol % in total of the fluorinated saturated cyclic carbonate and the fluorinated acyclic carbonate relative to the solvent.

The electrolyte solution preferably contains 0.001 to 5 mass % of the lithium salt (3) relative to the solvent.

The electrolyte solution preferably contains 0.001 to 5 mass % of the lithium salt (4) relative to the solvent.

The electrolyte solution preferably contains 0.001 to 5 mass %% of the organosilicon compound relative to the solvent.

The invention also relates to an electrochemical device including the above electrolyte solution.

The invention also relates to a secondary battery including the above electrolyte solution.

The invention also relates to a module including the above electrochemical device or the above secondary battery.

Advantageous Effects of Invention

The electrolyte solution of the invention can provide an electrochemical device such as a lithium secondary battery or a module having a small IV resistance value (internal resistance) and excellent high-temperature storage performance.

The electrochemical device, the secondary battery, and the module of the invention each have a small IV' resistance value (internal resistance) and excellent high-temperature storage performance.

DESCRIPTION OF EMBODIMENTS

The invention will be specifically described hereinbelow.

The electrolyte solution of the invention contains a solvent, an organosilicon compound, a lithium salt (3), and a lithium salt (4).

The organosilicon compound is at least one selected from the group consisting of a compound represented by the following formula (1) and a compound represented by the following formula (2).

The formula (1) is as follows:

$(R^{11})_{n11}-M^{11}-O-SiR^{12}R^{13}R^{14}$ wherein $M^{11}$ is a metal atom, P, B, or P=O; $R^{11}$ is a C1-C11 alkyloxy group, a silyloxy group, or a C1-C11 alkylsilyloxy group; $n^{11}$ is the number of $R^{11}$s binding to $M^{11}$, and is the oxidation number of $M^{11}$ minus 1 or the oxidation number of $M^{11}$ minus 3; when $n^{11}$ is 2 or greater, $R^{11}$s are the same as or different from each other; $R^{12}$ to $R^{14}$ are the same as or different from each other, and are each a C1-C11 alkyl group, a C2-C11 alkenyl group, a C1-C11 alkyloxy group, or a C6-C11 aryl group.

The formula (2) is as follows:

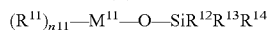

$R^{21}R^{22}R^{23}-Si-F$ wherein $R^{21}$ to $R^{23}$ are the same as or different from each other, and are each a C1-C11 alkyl group, a C2-C11 alkenyl group, a C1-C11 alkyloxy group, or a C6-C11 aryl group.

Examples of $M^{11}$ include Mg, B, Al, Si, P, P=O, Sc, Ti, V, Cr, Mn, Fe, Co, Ni, Cu, Zn, Ge, Sn, Y, Zr, and Nb. Preferred is Al, B, P, P=O, Ti, or Zr, more preferred is B, P, or P=O.

Examples of $R^{11}$ include methoxy, ethoxy, propoxy, isopropoxy, normal-butoxy, sec-butoxy, tert-butoxy, pentoxy, hexyloxy, phenoxy, trimethylsilyloxy, triethylsilyloxy, trimethoxysilyloxy, and triethoxysilyloxy groups. Preferred are methoxy, ethoxy, propoxy, isopropoxy, normal-butoxy, and trimethylsilyloxy groups.

Examples of $R^{12}$ to $R^{14}$ include methyl, ethyl, vinyl, propyl, isopropyl, 1-propenyl, 2-propenyl, 1-propynyl, 2-propynyl, n-butyl, isobutyl, sec-butyl, t-butyl, 1-butenyl, 2-butenyl, 3-butenyl, 2-methyl-2-propenyl, 1-methylenepropyl, 1-methyl-2-propenyl, 1,2-dimethylvinyl, 1-butynyl, 2-butynyl, 3-butynyl, pentyl, 1-methylbutyl, 2-methylbutyl, 3-methylbutyl, 1-methyl-2-methylpropyl, 2,2-dimethylpropyl, phenyl, methylphenyl, ethylphenyl, pentamethylphenyl, methoxy, ethoxy, propoxy, isopropoxy, n-butoxy, isobutoxy, sec-butoxy, tort-butoxy, pentoxy, hexyloxy, and phenoxy groups.

In order to achieve good solubility, $R^{12}$ to $R^{14}$ are each preferably an alkyl group or an oxyalkyl group having a carbon number of 4 or smaller, specifically preferably a methyl, ethyl, propyl, isopropyl, normal-butyl, isobutyl, sec-butyl, methoxy, ethoxy, propoxy, isopropoxy, normal-butoxy, isobutoxy, or sec-butoxy group, more preferably a methyl group.

Examples of the compound represented by the formula (1) include the following compounds:

magnesium bis (trimethylsiloxide), tris(trimethylsilyl) borate, tris(trimethoxysilyl) borate, tris(triethylsilyl) borate, tris(triethoxysilyl) borate, tris (dimethylvinylsilyl) borate, tris(diethylvinylsilyl) borate, aluminum tris(trimethylsiloxide), dimethoxyaluminoxytrimethylsilane, dimethoxyaluminoxytrimethoxysilane, diethoxyaluminoxytrimethylsilane, diethoxyaluminoxytriethoxysilane, dipropyloxyaluminoxytrimethylsilane, dibutoxyaluminoxytrimethylsilane, dibutoxyaluminoxytrimethoxysilane, dibutoxyaluminoxytriethylsilane, dibutoxyalumlnoxytriethoxysilane, dipropoxyaluminoxytriethoxysilane, dibutoxyaluminoxytripropyisilane, dibutoxyaluminoxytrimethoxysilane, dibutoxyaluminoxytriethoxysilane, dibutoxyaluminoxytripropyloxysilane, dibutoxyaluminoxytriphenoxysilane, tris(trimethylsilyl) phosphate, tris (triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate, tris(diethylvinylsilyl) phosphate, scandium tris(trimethylsiloxide), titanium tetrakis(trimethylsiloxide), titanium tetrakis(triethylsiloxide), titanium tetrakis(trimethoxysiloxide), titanium oxybis(trimethylsiloxide), vanadium oxytris(trimethylsiloxide), zinc bis (trimethylsiloxide), germanium tetrakis(trimethylsiloxide), tin tetrakis(trimethylsiloxide), yttrium tris(trimethylsiloxide), zirconium tetrakis(trimethylsiloxide), niobium pentakis(trimethylsiloxide), tris(trimethylsilyl) phosphite, tris(triethylsilyl) phosphite, tris(tripropylsilyl) phosphate, tris (triphenylsilyl) phosphite, tris(trimethoxysilyl) phosphite, tris(triethoxysilyl) phosphite, tris(triphenoxysilyl) phosphite, tris(dimethylvinylsilyl) phosphite, and tris(diethylvinylsilyl) phosphite.

Preferred are tris(trimethylsilyl) borate, tris(trimethoxysilyl) borate, tris(trimethylsilyl) phosphate, tris(trimethoxysilyl) phosphate, dimethoxyaluminoxytrimethoxysilane, diethoxyaluminoxytriethoxysilane, dipropoxyaluminoxytriethoxysilane, dibutoxyaluminoxytrimethoxysilane, dibutoxyaluminoxytriethoxysilane, titanium tetrakis(trimethylsiloxide), titanium tetrakis(triethylsiloxide), tris (trimethylsilyl) phosphite, and tris(triethylsilyl) phosphite.

In the compound represented by the formula (1), preferably, $M^{11}$ is P=O or P, $R^{11}$ is a C1-C4 alkylsilyloxy group, $n^{11}$ is 2, and $R^{12}$ to $R^{14}$ are each a C1-C4 alkyl group.

The electrolyte solution may contain one compound represented by the formula (1) or two or more compounds represented by the formula (1).

The following describes the compound represented by the formula (2):

$R^{21}R^{22}R^{23}-Si-F$     (2)

wherein $R^{21}$ to $R^{23}$ are the same as or different from each other, and are each a C1-C11 alkyl group, a C2-C11 alkenyl group, a C1-C11 alkyloxy group, or a C6-C11 aryl group.

Examples of $R^{21}$ to $R^{23}$ include methyl, ethyl, vinyl, propyl, isopropyl, 1-propenyl, 2-propenyl, 1-propynyl, 2-propynyl, n-butyl, isobutyl, sec-butyl, t-butyl, 1-butenyl, 2-butenyl, 3-butenyl, 2-methyl-2-propenyl, 1-methylenepropyl, 1-methyl-2-propenyl, 1,2-dimethylvinyl, 1-butynyl, 2-butynyl, 3-butynyl, pentyl, 1-methylbutyl, 2-methylbutyl, 3-methylbutyl, 1-methyl-2-methylpropyl, 2,2-dimethylpropyl, phenyl, methylphenyl, ethylphenyl, pentamethylphenyl, methoxy, ethoxy, propoxy, isopropoxy, butoxy, isobutoxy, sec-butoxy, tert-butoxy, pentoxy, hexyloxy, and phenoxy groups.

In order to achieve Good solubility, $R^{21}$ to $R^{23}$ are each preferably an alkyl group having a carbon number of 4 or smaller or an alkyloxy group having a carbon number of 4 or smaller, specifically preferably a methyl, ethyl, propyl, isopropyl, normal-butyl, isobutyl, sec-butyl, methoxy, ethoxy, propoxy, isopropoxy, normal-butoxy, isobutoxy, or sec-butoxy group, more preferably a methyl group.

Examples of the compound represented by the formula (2) include the following compounds:

trimethylsilyl fluoride, triethylsilyl fluoride, tripropylsilyl fluoride, tributylsilyl fluoride, tri-tert-butylsilyl fluoride, dimethylethylsilyl fluoride, dimethylpropylsilyl fluoride, dimethylbutylsilyl fluoride, methyl diethylsilyl fluoride, methyl dipropylsilyl fluoride, methyl dibutylsilyl fluoride, methyl di-tert-butylsilyl fluoride, diethylpropylsilyl fluoride, diethylbutylsilyl fluoride, diethyl tert-butylsilyl fluoride, ethyldipropylsilyl fluoride, ethyldibutylsilyl fluoride, ethyl di-tert-butylsilyl fluoride, propyldibutylsilyl fluoride, and propyl di-tort-butylsilyl fluoride.

Preferred are trimethylsilyl fluoride, triethylsily fluoride, dimethyl ethylsilyl fluoride, and methyl diethylsilyl fluoride.

The electrolyte solution may contain one compound represented by the formula (2) or two or more compounds represented by the formula (2).

In order to provide an electrochemical device having a much smaller IV resistance value and much better high-temperature storage performance, the electrolyte solution of the invention preferably contains 0.001 to 5 mass % of the organosilicon compound relative to the solvent. The amount of the organosilicon compound is more preferably 0.01 mass % or more, still more preferably 0.1 mass % or more, particularly preferably 0.3 mass % or more, while more preferably 2 mass % or less.

The lithium salt (3) is a lithium salt including an oxalato-complex as an anion and is a lithium salt of a complex including oxalic acid as a ligand.

The lithium salt (3) is preferably at least one selected from the group consisting of a bis(oxalato)borate, a difluoro(oxalato) borate, a tris (oxalato) phosphate, a difluoro(bisoxalato)phosphate, and a tetrafluoro(oxalato)phosphate.

In order to provide an electrochemical device having much smaller IV resistance value and much better high-temperature storage performance, the electrolyte solution of The invention preferably contains 0.001 to 5 mass % of the lithium salt (3) relative to the solvent. The amount of the lithium salt (3) is more preferably 0.01 mass % or more, still more preferably 0.1 mass % or more, particularly preferably 0.3 mass % or more, while more preferably 2 mass % or less.

The lithium salt (4) is represented by the following formula (4):

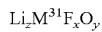

wherein $M^{31}$ is P, As, or Sb: x, y, and z are each an integer of 1 or greater with $z=7-(2y+x)$, z is 1 or 2 and y is an integer of 3 or smaller.

The lithium salt (4) is preferably at least one selected from the group consisting of $LiPO_2F_2$, $Li_2PO_3F$, $LiAsO_2F_2$, $Li_2AsO_3F$, $LiSbO_2F_2$, and $Li_2SbO_3F$.

In order to provide an electrochemical device having a much smaller IV resistance value and much better high-temperature storage performance, the electrolyte solution of the invention preferably contains 0.001 to 5 mass % of the lithium salt (4) relative to the solvent. The amount of the lithium salt (4) is more preferably 0.01 mass % or more, still more preferably 0.1 mass % or more, particularly preferably 0.3 mass % or more, while more preferably 2 mass % or less.

The electrolyte solution of the invention contains a solvent. The solvent is preferably a non-aqueous solvent and the electrolyte solution of the invention is preferably a non-aqueous electrolyte solution.

The solvent in the invention contains a fluorinated acyclic carbonate having a fluorine content of 33 to 70 mass %.

The fluorinated acyclic carbonate is an acyclic carbonate containing a fluorine atom and having a fluorine content of 33 to 70 mass %. In order to provide an electrochemical device having a much smaller IV resistance value and much better high-temperature storage performance, the lower limit of the fluorine content is more preferably 34 mass %, still more preferably 36 mass %. The upper limit of the fluorine content is more preferably 60 mass %, still more preferably 55 mass %.

The fluorine content is a value calculated based on the structural formula of the fluorinated acyclic carbonate by the following formula: {(Number of fluorine atoms×19)/(molecular weight of the fluorinated acyclic carbonate)}×100 (%).

In order to provide an electrochemical device having a much smaller IV resistance value and much better high-temperature storage performance, the fluorinated acyclic carbonate is preferably a fluorine-containing carbonate represented by the following formula (B):

(wherein $Rf^1$ and $Rf^2$ are the same as or different from each other, and are each a C1-C11 alkyl group optionally containing a fluorine atom and optionally containing an ether bond, and at least one of $Rf^1$ and $Rf^2$ is a C1-C11 fluorine-containing alkyl group optionally containing an ether bond). The carbon number of each of $Rf^1$ and $Rf^2$ is preferably 1 to 5.

Examples of $Rf^1$ and $Rf^2$ include fluorine-containing alkyl groups such as $CF_3-$, $CF_3CH_2-$, $HCF_2CH_2-$, $HCF_2CH_2-$, $HCF_2CF_2CH_2-$, $CF_3CF_2CH_2-$, $(CF_3)_2CH-$, $H(CF_2CF_2)_2CH_2-$, and $CF_3-CF_2-$; fluorine-containing alkyl groups containing an ether bond such as $C_3F_7OCF(CF_3)CH_2-$, $C_3FOCF(CF_3)CF_2OCF(CF_3)CH_2-$, $C_2F_5OCF(CF_3)CH_2-$, $CF_3OCF(CF_3)CH_2-$, and $C_2F_5OC(CF_3)_2CH_2-$; and fluorine-free alkyl groups such as $CH_3-$, $C_3H_5-$, $C_3H_7-$, and $C_4H_5-$.

Any combination of these groups may be selected such that the fluorinated acyclic carbonate can have a fluorine content within the above range.

Specific examples of the fluorinated acyclic carbonate include $(CF_3CH_2O)_2CO$, $(HCF_2CF_2CH_2O)_2CO$, $(CF_3CF_2CH_2O)_2CO$, $((CF_3)_2CHO)_2CO$, $(H(CF_2CF_2)_2CH_2O)_2CO$, $(C_3F_7OCF(CF_3)CF_2OCF(CF_3)CH_2O)_2CO$, $(C_3F_7OCF(CF_3)CH_2O)_2CO$, $CH_3OCOOCH_2CF_2CF_3$, $CH_3OCOOCH_2CF_2CF_2H$, $C_2H_5OCOOCH_2CF_2CF_2H$, $CH_3OCOOCH_2CF_3$, $C_2H_5OCOOCH_2CF_3$, $CF_3CF_2CH_2OCOOCH_2CF_2CF_2H$, $C_3F_7OCF(CF_3)CH_2OCOOC_3H_7$, $HCF_2CF_2CH_2OCOOC_3H_7$, $(CF_3)_2CHOCOOCH_3$, and $CH_3OCOOCF_3$.

The fluorinated acyclic carbonate is preferably at least one selected from the group consisting of $(CF_3CH_2O)_2CO$, $(HCF_2CF_2CH_2O)_2CO$, $(CF_3CF_2CH_2O)_2CO$, $((CF_3)_2CHO)_2$ CO, $(H(CF_2CF_2)_2CH_2O)_2CO$, $(C_3F_7OCF(CF_3)CF_2OCF(CF_3)CH_2O)_2CO$, $(C_3F_7OCF(CF_3)CH_2O)_2CO$, $CH_3OCOOCH_2CF_2CF_3$, $CH_3OCOOCH_2CF_2CF_2H$, $C_2H_5OCOOCH_2CF_2CF_2H$, $CH_3OCOOCH_2CF_3$, $C_2H_5OCOOCH_2CF_3$, $CF_3CF_2CH_2OCOOCH_2CF_2CF_2H$, $C_3F_7OCF(CF_3)CH_2OCOOC_3H_7$, $HCF_2CF_2CH_2OCOOC_3H_7$, $(CF_3)_2CHOCOOCH_3$, and $CH_3OCOOCF_3$.

In order to provide an electrochemical device having a much smaller IV resistance value and much better high-temperature storage performance, the solvent in the electrolyte solution of the invention preferably further contains a fluorinated saturated cyclic carbonate.

The fluorinated saturated cyclic carbonate is a saturated cyclic carbonate with a fluorine atom attached thereto. A specific example thereof is a fluorinated saturated cyclic carbonate (A) represented by the following formula (A):

[chem. 5]

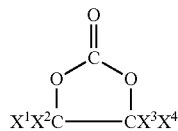
(A)

wherein $X^1$ to $X^4$ are the same as or different from each other, and are each —H, —$CH_3$, —F, a fluorinated alkyl group which optionally has an ether bond, or a fluorinated alkoxy Gu group which optionally has an ether bond; at least one of $X^1$ to $X^4$ is —F, a fluorinated alkyl group which optionally has an ether bond, or a fluorinated alkoxy group which optionally has an ether bond.

The presence of the fluorinated saturated cyclic carbonate (A) in the electrolyte solution of the invention which is applied to a lithium ion secondary battery enables formation of a stable film on the negative electrode, sufficiently reducing side reactions of the electrolyte solution on the negative electrode. This can provide significantly stable, excellent charge and discharge performance.

The term "ether bond" herein means a bond represented by —O—.

In order to achieve a good permittivity and oxidation resistance, one or two of $X^1$ to $X^4$ is/are each preferably —F, a fluorinated alkyl group which optionally has an ether bond, or a fluorinated alkoxy group which optionally has an ether bond in the formula (A).

In anticipation of a decrease in the viscosity at low temperatures, an increase in the flash point, and improvement in the solubility of an electrolyte salt, $X^1$ to $X^4$ are each preferably —H, —F, a fluorinated alkyl group (a), a fluorinated alkyl group (b) having an ether bond, or a fluorinated alkoxy group (c) in the formula (A).

The fluorinated alkyl group (a) is an alkyl group in which at least one hydrogen atom is replaced by a fluorine atom. The fluorinated alkyl group (a) preferably has a carbon number of 1 to 20, more preferably 2 to 17, still more preferably 2 to 7, particularly preferably 2 to 5.

Too large a carbon number may cause poor low-temperature performance and low solubility of the electrolyte salt. Too small a carbon number may cause low solubility of the electrolyte salt, low discharge efficiency, and a high viscosity, for example.

Examples of the fluorinated alkyl group (a) having a carbon number of 1 include $CFH_2$—, $CF_2H$—, and $CF_3$—.

In order to achieve good solubility of the electrolyte salt, a preferred example of the fluorinated alkyl group (a) having a carbon number of 2 or greater is a fluorinated alkyl group represented by the following formula (a-1):

$R^1—R^2—$ (a-1)

wherein $R^1$ is an alkyl group which optionally has a fluorine atom and which has a carbon number of 1 or greater; $R^2$ is a C1-C3 alkylene group which optionally has a fluorine atom; and at least one selected from $R^1$ and $R^2$ has a fluorine atom.

$R^1$ and $R^2$ each may further contain an atom other than carbon, hydrogen, and fluorine atoms.

$R^1$ is an alkyl group which optionally has a fluorine atom and which has a carbon number of 1 or greater. $R^1$ is preferably a C1-C16 linear or branched alkyl group. The carbon number of $R^1$ is more preferably 1 to 6, still more preferably 1 to 3.

Specifically, for example, $CH_3$—, $CH_3CH_2$—, $CH_3CH_2CH_2$—, $CH_3CH_2CH_2CH_2$—, and groups represented by the following formulas:

[chem. 6]

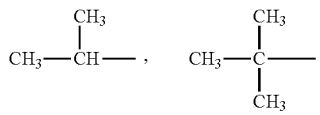

may be mentioned as linear or branched alkyl groups for $R^1$.

Examples of $R^1$ which is a linear alkyl group containing a fluorine atom include $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CH_2CH_2CH_2CH_2$—, $CF_3CH_2CH_2CH_2CH_2$—, $CF_3CH_2CH_2CF_2CH_2$—, $CF_3CF_2CH_2CH_2CH_2$—, $CF_3CF_2CF_2CH_2CH_2$—, $CF_3CF_2CH_2CF_2CH_2$—, $HCF_2$—, $HCF_2CH_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2$—, $HCF_2CH_2CF_2CH_2CH_2$—, $HCF_2CF_2CF_2CF_2CH_2$—, $HCF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CF_2CH_2CH_2$—, $CH_3CF_2CH_2CF_2CH_2CH_2$—, $HCFClCF_2CH_2$—, $HCF_2CFClCH_2$—, $HCF_2CFClCF_2CFClCH_2$—, and $HCFClCF_2CFClCF_2CH_2$—.

Examples of $R^1$ which is a branched alkyl group containing a fluorine atom include those represented by the following formulas,

[chem. 7]

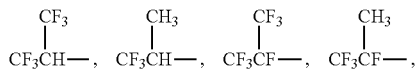

-continued

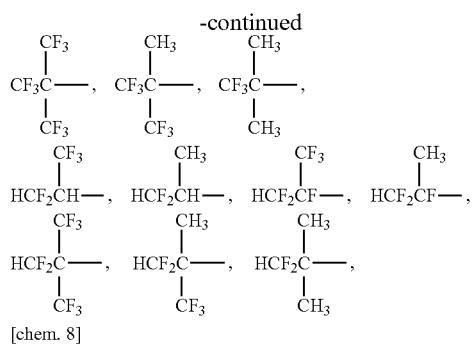

[chem. 8]

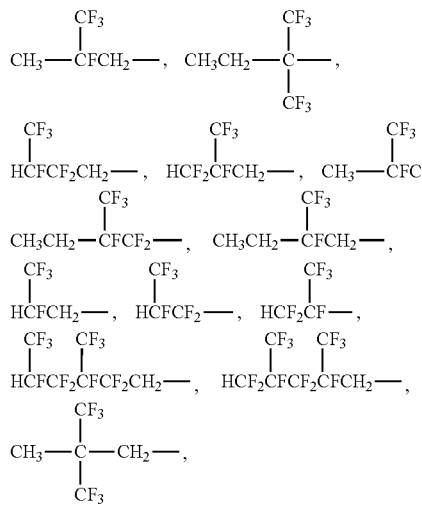

A group having a branch such as —CH₃ or —CF₃ is likely to cause high viscosity. Thus, the number of such branches is more preferably small (one) or zero.

$R^2$ is a C1-C3 alkylene group which optionally has a fluorine atom. $R^2$ may be linear or branched. Examples of a minimum structural unit constituting such a linear or branched alkylene group are shown below. $R^2$ is constituted by one or combination of these units.

(i) Linear Minimum Structural Units

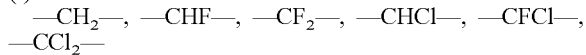

(ii) Branched Minimum Structural Units

[chem. 9]

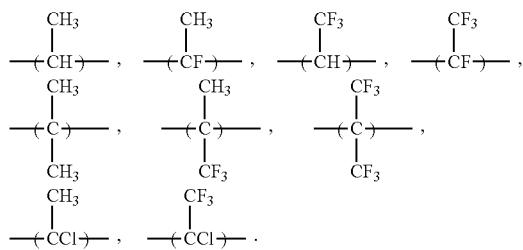

Preferred among these exemplified units are Cl-free structural units because such units are not dehydrochlorinated by a base, and thus are more stable.

$R^2$ which is a linear group consists only of any of the above linear minimum structural units, preferably —CH₂—, —CH₂CH₂—, or —CF₂—. In order to further improve the solubility of the electrolyte salt, —CH₂— or —CH₂CH₂— is more preferred.

$R^2$ which is a branched group includes at least one of the above branched minimum structural units. A preferred example thereof is a group represented by —(CX$^a$X$^b$)— (wherein X$^a$ is H, F, CH₃, or CF₃; X$^b$ is CH₃ or CF₃; if X$^b$ is CF₃, X$^a$ is H or CH₃). Such a group can much further improve the solubility of the electrolyte salt.

For example, CF₃CF₂—, HCF2CF₂—, H₂CFCF₂—, CH₃CF₂—, CF₃CF₂CF₂—, HCF₂CF₂CF₂—, H₂CFCF₂CF₂—, CH₃CF₂CF₂—, and those represented by the following formulas:

[chem. 10]

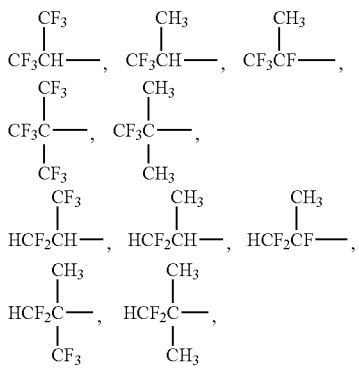

[chem. 11]

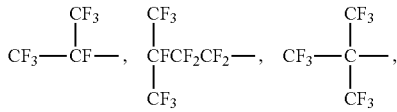

may be mentioned as preferred examples of the fluorinated alkyl group (a).

The fluorinated alkyl group (b) having an ether bond is an alkyl group having an ether bond in which at least one hydrogen atom is replaced by a fluorine atom. The fluorinated alkyl group (b) having an ether bond preferably has a carbon number of 2 to 17. Too large a carbon number may cause high viscosity of the fluorinated saturated cyclic carbonate (A). This may also cause the presence of many fluorine-containing groups, resulting in poor solubility of the electrolyte salt due to reduction in the permittivity, and poor compatibility with other solvents. Accordingly, the carbon number of the fluorinated alkyl group (b) having an ether bond is preferably 2 to 10, more preferably 2 to 7.

The alkylene group which constitutes the ether moiety of the fluorinated alkyl group (b) having an ether bond may be a linear or branched alkylene group. Examples of a minimum structural unit constituting such a linear or branched alkylene group are shown below.

(i) Linear Minimum Structural Units

(ii) Branched Minimum Structural Units

[chem. 12]

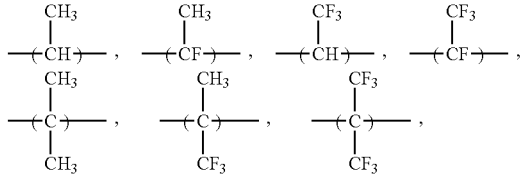

The alkylene group may be constituted by one of these minimum structural units, or may he constituted by multiple linear units (i), by multiple branched units (ii), or by a combination of a linear unit (i) and a branched unit (ii). Preferred examples will be mentioned in detail later.

Preferred among these exemplified units are Cl-free structural units because such units are not dehydrochlorinated by a base, and thus are more stable.

A still more preferred example of the fluorinated alkyl group (b) having an ether bond is a group represented by the following formula. (b-1):

$$R^3—(OR^4)_{n1}— \quad (b-1)$$

wherein $R^3$ is preferably a C1-C6 alkyl group which optionally has a fluorine atom; $R^4$ is preferably a C1-C4 alkylene group which optionally has a fluorine atom; n1 is an integer of 1 to 3; and at least one selected from $R^3$ and $R^4$ has a fluorine atom.

Examples of $R^3$ and $R^4$ include the following groups, and any appropriate combination of these groups can provide the fluorinated alkyl group (b) having an ether bond represented by the formula (b-1). Still, the groups are not limited thereto.

(1) $R^3$ is preferably an alkyl group represented by $X^c_3C—(R^5)_{n2}—$, wherein three X's are the same as or different from each other, and are each H or F; $R^5$ is a C1-C5 alkylene group which optionally has a fluorine atom; and n2 is 0 or 1.

If n2 is 0, $R^3$ may be $CH_3—$, $CF_3—$, $HCF—$, or $H_2CF—$, for example.

If n2 is 1, specific examples of $R^3$ which is a linear group include $CF_3CH_2—$, $CF_3CF_2—$, $CF_3CH_2CH_2—$, $CF_3CF_2CH_2—$, $CF_3CF_2CF_2—$, $CF_3CH_2CF_2—$, $CF_3CH_2CH_2CH_2—$, $CF_3CF_2CH_2CH_2—$, $CF_3CH_2CF_2CH_2—$, $CF_3F_2CF_2CH_2—$, $CF_3CF_2CF_2CF_2—$, $CF_3CF_2CH_2CF_2—$, $CF_3CH_2CH_2CH_2CH_2—$, $CF_3CF_2CH_2CH_2CH_2—$, $CF_3CH_2CF_2CH_2CH_2—$, $CF_3CF_2CH_2CH_2CH_2—$, $CF_3CF_2CF_2CH_2CH_2—$, $CF_3CF_2CF_2CF_2CH_2—$, $CF_3CF_2CH_2CF_2CH_2—$, $CF_3CF_2CF_2CF_2CH_2—$, $CF_3CF_2CF_2CF_2CH_2CH_2—$, $CF_3CF_2CH_2CF_2CH_2CH_2—$, $HCF_2CH_2—$, $HCF_2CF_2—$, $HCF_2CH_2CH_2—$, $HCF_2CF_2CH_2—$, $HCF_2CH_2CF_2—$, $HCF_2CF_2CH_2CH_2—$, $HCF_2CH_2CF_2CH_2—$, $HCF_2CF_2CF_2CF_2—$, $HCF_2CF_2CH_2CH_2CH_2—$, $HCF_2CH_2CF_2CH_2CH_2—$, $HCF_2CF_2CF_2CF_2CH_2—$, $HCF_2CF_2CF_2CF_2CH_2CH_2—$, $FCH_2CH_2—$, $FCH_2CF_2—$, $FCH_2CF_2CH_2—$, $FCH_2CF_2CH_2—$, $CH_3CF_2—$, $CH_3CH_2—$, $CH_3CF_2CH_2—$, $CH_3CF_2CF_2—$, $CH_3CH_2CH_2—$, $CH_3CF_2CH_2CF_2—$, $CH_3CF_2CF_2CF_2—$, $CH_3CH_2CF_2CF_2—$, $CH_3CH_2CH_2CH_2—$, $CH_3CF_2CH_2CF_2CH_2—$, $CH_3CF_2CF_2CF_2CH_2—$, $CH_3CF_2CF_2CH_2CH_2—$, $CH_3CH_2CF_2CF_2CH_2—$, $CH_3CH_2CF_2CF_2CH_2CH_2—$, and $CH_3CF_2CH_2CF_2CH_2CH_2—$.

If n2 is 1, those represented by the following formulas:

[chem. 13]

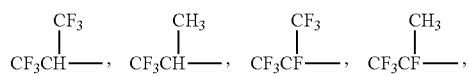

may be mentioned as examples of $R^3$ which is a branched group.

A group having a branch such as $—CH_3$ or $—CF_3$ is likely to cause high viscosity. Thus, $R^3$ is more preferably a linear group.

(2) in $—(OR^4)_{n1}—$ of the formula (b-1), n1 is an integer of 1 to 3, preferably 1 or 2. If n1 is 2 or 3. $R^4$s may he the same as or different from each other.

Preferred specific examples of $R^4$ include the following linear or branched groups.

Examples of the linear groups include $—CH_2—$, $—CHF—$, $—CF_2—$, $—CH_2CH—$, $—CF_2CH_2—$, $—CF_2CF_2—$, $—CH_2CF_2—$, $—CH_2CH_2CH_2—$, $—CH_2CH_2CF_2—$, $—CH_2CF_2CH_2—$, $—CH_2CF_2CF_2—$, $—CF_2CH_2CH_2—$, $—CF_2CF_2CH_2—$, $—CF_2CH_2CF_2—$, and $—CF_2CF_2CF_2—$.

Those represented by the following formulas:

[chem. 14]

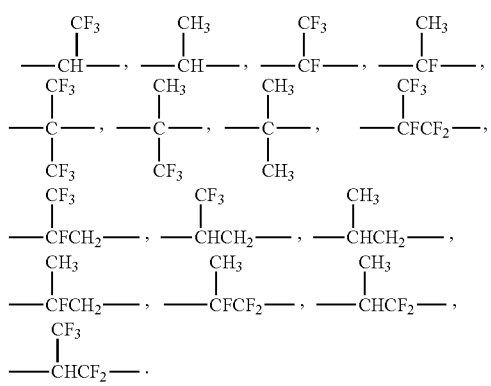

may be mentioned as examples of the branched groups.

The fluorinated alkoxy group (c) is an alkoxy group in which at least one hydrogen atom is replaced by a fluorine atom. The fluorinated alkoxy group (c) preferably has a carbon number of 1 to 17. The carbon number is more preferably 1 to 6.

The fluorinated alkoxy group (c) is particularly preferably a fluorinated alkoxy group represented by $X_d^3C—(R^6)_{n3}—O—$, wherein three $X^d$s are the same as or different from each other, and are each H or F; $R^6$ is preferably a C1-C5 alkylene group which optionally has a fluorine atom; n3 is 0 or 1; and any of the three $X^d$s is a fluorine atom.

Specific examples of the fluorinated alkoxy group (c) include fluorinated alkoxy groups in which an oxygen atom binds to an end of an alkyl group mentioned as an example for $R^1$ in the formula (a-1).

The fluorinated alkyl group (a), the fluorinated alkyl group (b) having an ether bond, and the fluorinated alkoxy group (c) in the fluorinated saturated cyclic carbonate (A) each preferably have a fluorine content of 10 mass % or more. Too low a fluorine content may cause a failure in sufficiently achieving an effect of increasing the flash point. Thus, the fluorine content is more preferably 20 mass % or more, still more preferably 30 mass % or more. The upper limit thereof is usually 85 mass %.

The fluorine content of each of the fluorinated alkyl group (a), the fluorinated alkyl group (b) having an ether bond, and the fluorinated alkoxy group (c) is a value calculated based on the corresponding structural formula by the following formula:

{(Number of fluorine atoms×19)/(formula weight of the group)}×100 (%).

In order to achieve a good permittivity and oxidation resistance, the fluorine content in the whole fluorinated saturated cyclic carbonate is preferably 5 mass % or more, more preferably 10 mass % or more. The upper limit thereof is usually 76 mass %.

The fluorine content in the fluorinated saturated cyclic carbonate (A) is a value calculated based on the structural formula of the fluorinated saturated cyclic carbonate (A) by the following formula:

{(Number of fluorine atoms×19)/(molecular weight of fluorinated saturated cyclic carbonate (A)}×100 (%).

Specific examples of the fluorinated saturated carbonate (A) include the following.

Specific examples of the fluorinated saturated cyclic carbonate (A) in which at least one of $X^1$ to $X^4$ is —F in the formula (A) include those represented by the following formulas.

[chem. 15]

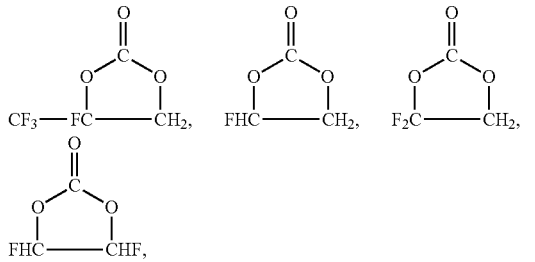

These compounds have a high withstand voltage and give good solubility of the electrolyte salt. Alternatively, those represented by the following formulas:

[chem. 16]

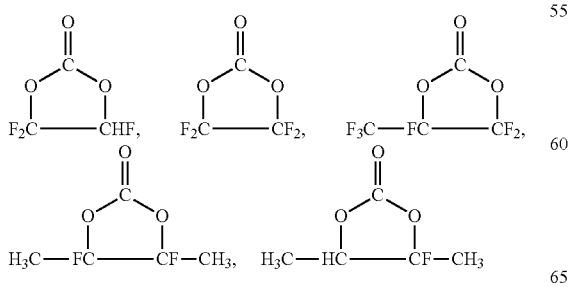

may also be used.

Those represented by the following formulas:

[chem. 17]

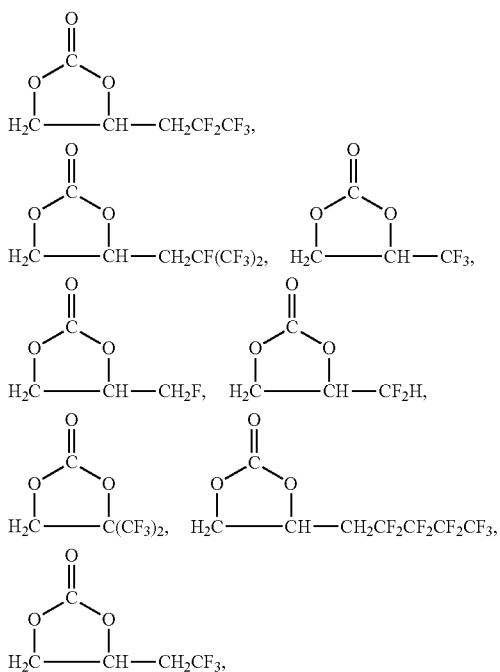

[chem. 18]

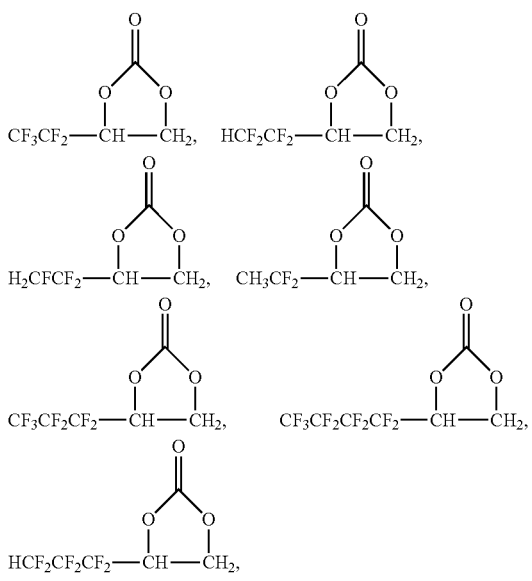

[chem. 19]

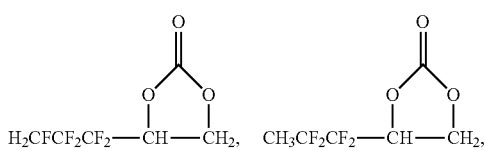

may be mentioned as specific examples of the fluorinated saturated cyclic carbonate (A) in which at least one of $X^1$ to $X^4$ is a fluorinated alkyl group (a) and the others thereof are —H in the formula (A).

Those represented by the following formulas:

[chem. 20]

$CF_3O-CH_2-CH-CH_2$ (cyclic carbonate), $CF_3-OCH_2-CH-CH_2$ (cyclic carbonate), $HCF_2-OCH_2-CH-CH_2$ (cyclic carbonate), $CF_3CH_2-OCH_2-CH-CH_2$ (cyclic carbonate), $CF_3CF_2CH_2-OCH_2-CH-CH_2$ (cyclic carbonate), $CF_3CF_2CF_2-OCH_2-CH-CH_2$ (cyclic carbonate), $CF_3(CF_3)CH-OCH_2-CH-CH_2$ (cyclic carbonate), $(CF_3)_3C-OCH_2-CH-CH_2$ (cyclic carbonate), $CH_3(CF_3)_2CCH_2-OCH_2-CH-CH_2$ (cyclic carbonate),

[chem. 21]

$FCH_2CF_2CF_2-OCH_2-CH-CH_2$ (cyclic carbonate), $FCH_2CF_2CH_2-OCH_2-CH-CH_2$ (cyclic carbonate), $CF_3CH_2CH_2-OCH_2-CH-CH_2$ (cyclic carbonate), $CF_3CF_2CH_2CH_2-OCH_2-CH-CH_2$ (cyclic carbonate), $CH_3CF_2CH_2CH_2-OCH_2-CH-CH_2$ (cyclic carbonate), $HCF_2CF_2CH_2-OCH_2-CH-CH_2$ (cyclic carbonate), $CF_3CF_2CF_2CH_2CH_2-OCH_2-CH-CH_2$ (cyclic carbonate),

[chem. 22]

$HCF_2CF_2CF_2CF_2CH_2-OCH_2-CH-CH_2$ (cyclic carbonate), $CF_3CF_2CF_2-OCFCH_2-OCH_2-CH-CH_2$ with $CF_3$ substituent (cyclic carbonate), $CF_3CF_2CF_2-OCFCF_2-OCH_2-CH-CH_2$ with $CF_3$ substituent (cyclic carbonate), $CH_3-OCFCH_2-OCH_2-CH-CH_2$ with $CF_3$ substituent (cyclic carbonate), $CF_3CF_2CF_2-OCFCF_2-OCFCH_2-OCH_2-CH-CH_2$ with two $CF_3$ substituents (cyclic carbonate), $FCH_2CF_2CF_2-OCH_2CF_2CF_2-OCH_2-CH-CH_2$ (cyclic carbonate), $FCH_2CF_2CF_2-OCH_2CF_2CH_2-OCH_2-CH-CH_2$ (cyclic carbonate), -continued

[chem. 23]

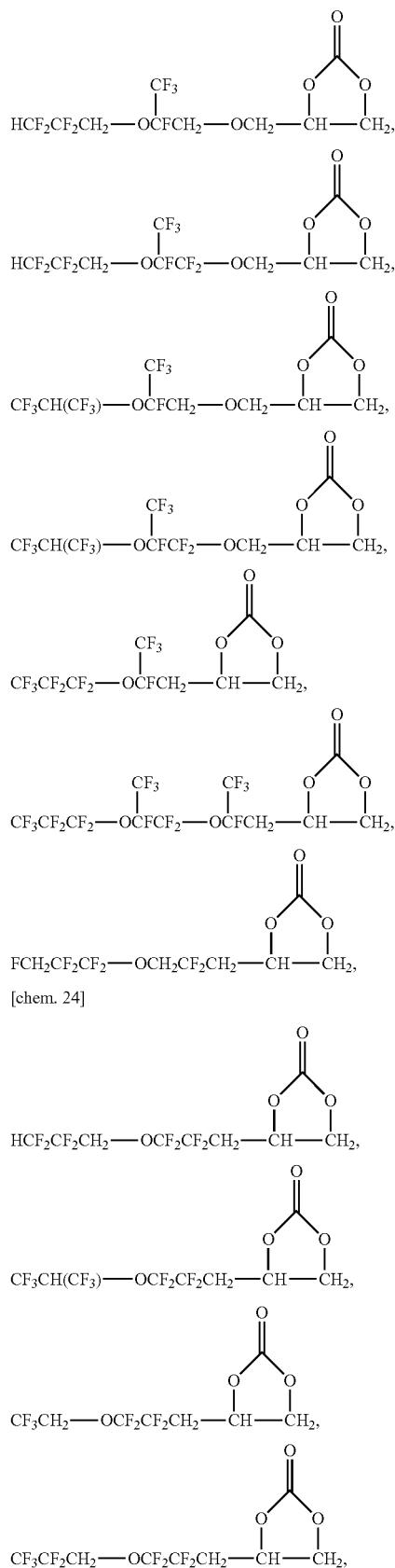

[chem. 24]

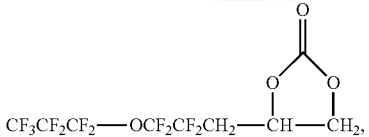
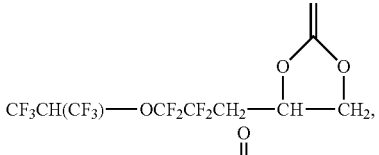
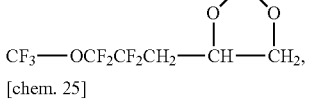

[chem. 25]

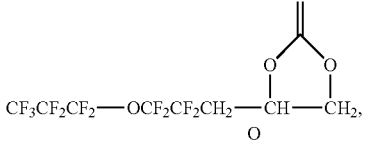
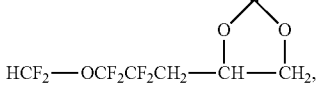
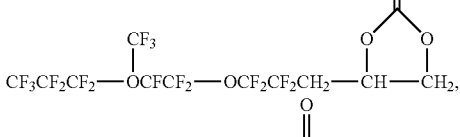
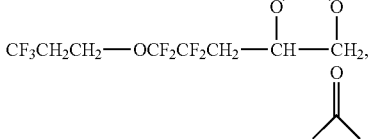
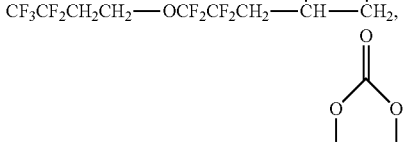
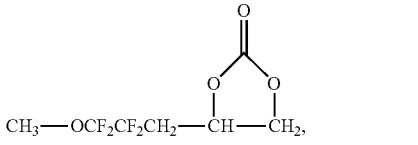
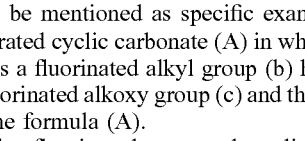

may be mentioned as specific examples of the fluorinated saturated cyclic carbonate (A) in which at least one of $X^1$ to $X^4$ is a fluorinated alkyl group (b) having an ether bond or a fluorinated alkoxy group (c) and the others thereof are —H in the formula (A).

The fluorinated saturated cyclic carbonate (A) is not limited to the above specific examples. One of the above fluorinated saturated cyclic carbonates (A) may be used alone, or two or more thereof may be used in any combination at any ratio. Preferred amounts of the fluorinated saturated cyclic carbonate will be mentioned later. These preferred amounts also correspond to preferred amounts of the fluorinated saturated cyclic carbonate (A).

In particular, the fluorinated saturated cyclic carbonate is preferably any of the following compounds.

[chem. 26]

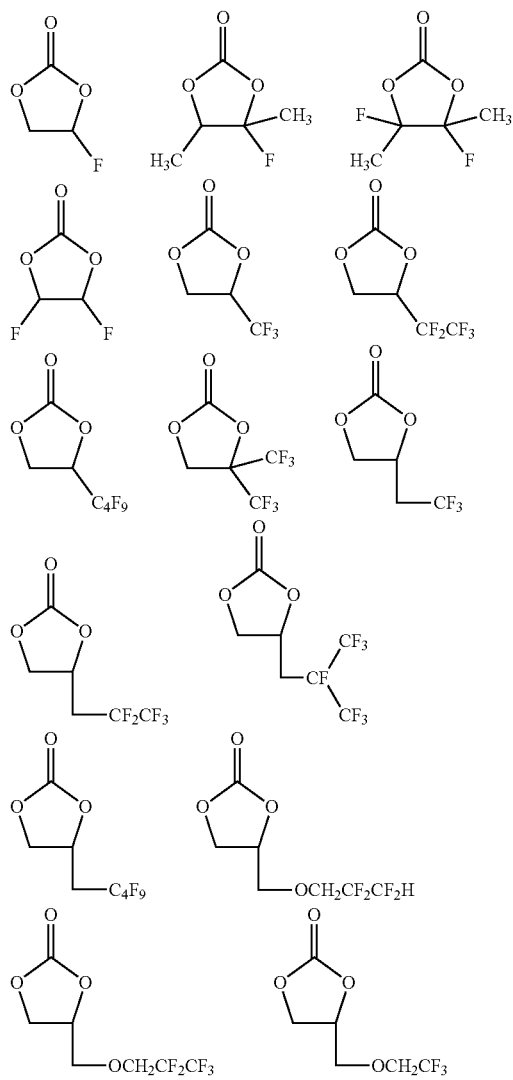

The fluorinated saturated cyclic carbonate is more preferably fluoroethylene carbonate or difluoroethylene carbonate.

The solvent may contain at least one selected from the group consisting of a non-fluorinated saturated cyclic carbonate and a non-fluorinated acyclic carbonate.

Examples of the non-fluorinated saturated cyclic carbonate include ethylene carbonate (EC), propylene carbonate (PC), and butylene carbonate.

In order to achieve a high permittivity and a suitable viscosity, the non-fluorinated saturated cyclic carbonate is preferably at least one compound selected from the group consisting of ethylene carbonate, propylene carbonate, and butylene carbonate.

The non-fluorinated saturated cyclic carbonate may include one of the above compounds or two or more thereof in combination.

Examples of the non-fluorinated acyclic carbonate include hydrocarbon-type acyclic carbonates such as $CH_3OCOOCH_3$ (dimethyl carbonate, DMC), $CH_3CH_2OCOOCH_2CH_3$ (diethyl carbonate, DEC), $CH_2CH_2OCOOCH_3$ (ethyl methyl carbonate, EMC), $CH_3OCOOCH_2CH_2CH_3$ (methyl propyl carbonate), methyl butyl carbonate, ethyl propyl carbonate, and ethyl butyl carbonate. Preferred among these is at least one compound selected from the group consisting of dimethyl carbonate, ethyl methyl carbonate, diethyl carbonate, methyl propyl carbonate, methyl butyl carbonate, ethyl propyl carbonate, and ethyl butyl carbonate.

The electrolyte solution of the invention preferably contains 5 to 85 vol % of the fluorinated acyclic carbonate relative to the solvent. This can provide an electrochemical device having a much smaller IV resistance value and much better high-temperature storage performance. The lower limit thereof is more preferably 15 vol %, still more preferably 20 vol %, particularly preferably 50 vol %, relative to the solvent. The upper limit thereof is more preferably 80 vol %, still more preferably 75 vol %, relative to the solvent.

The electrolyte solution of the invention preferably contains 15 to 95 vol % of the fluorinated saturated cyclic carbonate relative to the solvent. This can provide an electrochemical device having a much smaller IV resistance value and much better high-temperature storage performance. The lower limit thereof is more preferably 20 vol %, still more preferably 25 vol %, relative to the solvent. The upper limit thereof is more preferably 85 vol %, still more preferably 80 vol %, particularly preferably 50 vol %, relative to the solvent.

In order to provide an electrochemical device having a much smaller IV resistance value and much better high-temperature storage performance, the volume ratio of the fluorinated acyclic carbonate and the fluorinated saturated cyclic carbonate is preferably 5/95 to 85/15, more preferably 15/85 or higher, still more preferably 20/80 or higher, particularly preferably 50/50 or higher, most preferably 60/40 or higher, while more preferably 80/20 or lower, still more preferably 75/25 or lower.

In order to provide an electrochemical device having a much smaller IV resistance value and much better high-temperature storage performance, the electrolyte solution of the invention preferably contains 40 to 100 vol % in total of the fluorinated saturated cyclic carbonate and the fluorinated acyclic carbonate relative to the solvent. The fluorinated saturated cyclic carbonate and the fluorinated acyclic carbonate in an amount in total within the above range allows the electrolyte solution to be more suitable for high-voltage electrochemical devices. The sum of the amounts of the fluorinated saturated cyclic carbonate and the fluorinated acyclic carbonate is more preferably 60 to 100 vol %, still more preferably 70 to 100 vol %, particularly preferably 85 to 100 vol %.

The electrolyte solution of the invention preferably contains an electrolyte salt other than the lithium salt (3) and the lithium salt (4).

The electrolyte salt may be any salt that contains an alkali metal, an alkaline earth metal, or aluminum as a cation and is to be used for electrolyte solutions for electrochemical devices such as secondary batteries and electric double layer capacitors.

Examples of the salt that contains an alkali metal, an alkaline earth metal, or aluminum as a cation include inorganic salts such as $NaClO_4$, $Ca(ClO_4)_2$, $Al(ClO_4)_3$, $NaPF_6$, $Ca(PF_6)_2$, $Al(PF_6)_3$, $NaBF_4$, $Ca(BF_4)_2$, and $Al(BF_4)_3$, $NaSO_3CF_3$, $NaN(SO_2CF_3)_2$, $NaN(SO_2C_2F_5)_2$, NaN $(SO_2CF_3)(SO_2C_4F_9)$, $NaC(SO_2CF_3)_3$, $NaPF_4(CF_3)_2$, $NaPF_4$ $(C_2F_5)_2$, $NaPF_4(SO_2CF_3)_2$, $NaPF_4(SO_2C_2F_5)_2$, $NaBF_2$ $(CF_3)_2$, $NaBF_2(C_2F_5)_2$, $NaBF_2(SO_2CF_3)_2$, $NaBF_2$ $(SO_2C_2F_5)_2$, and those represented by $NaPF_a(C_nF_{2n+1})_{6-a}$ (wherein a is an integer of 0 to 5; and n is an integer of 1 to 6).

Examples of the lithium salt include flubrine-containing organic acid lithium salts such as $LiClO_4$, $LiPF_6$, $LiBF_4$, $LiSO_3CF_3$, $LiN(SO_2CF_3)_2$, $LiN(SO_2C_2F_5)_2LiN(SO_2CF_3)$ $(SO_2C_4F_9)$, $LiC(SO_2CF_3)_3$, $LiPF_4(CF_3)_2$, $LiPF_4(C_2F_5)_2$, $LiPF_4(SO_2CF_3)_2$, $LiPF_4(SO_2C_2F_5)_2$, $LiBF_2(CF_3)_2$, $LiBF_2$ $(C_2F_5)_2$, $LiBF_2(SO_2CF_3)_2$, $LiBF_2(SO_2C_2F_5)_2$, and salts represented by $LiPF_a(C_nF_{2n+1})_{6-a}$ (wherein a is an integer of 0 to 5; and n is an integer of 1 to 6). Preferred are lithium salts. These salts may be used alone or in combination of two or more thereof.

In order to reduce deterioration of the electrolyte solution after high-temperature storage, the lithium salt is preferably at least one selected from the group consisting of $LiPF_6$, $LiBF_4$, $LiSO_3CF_3$, $LiN(SO_2CF_3)_2$, $LiN(SO_2C_2F_5)_2$, and salts represented by $LiPF_a(C_nF_{2n+1})_{6-a}$ (wherein a is an integer of 0 to 5; and n is an integer of 1 to 6).

Examples of the salts represented by $LiPF_a(C_nF_{2n+1})_{6-a}$ include $LiPF_3(CF_3)_3$, $LiPF_3(C_2F_5)_3$, $LiPF_3(C_3F_7)_3$, $LiPF_3(C_4F_9)_3$, $LiPF_4(CF_3)_2$, $LiPF_4(C_2F_5)_2$, $LiPF_4(C_3F_7)_2$, and $LiPF_4(C_4F_9)_2$, wherein the alkyl groups represented by $C_3F_7$ or $C_4F_9$ in the formulas each may have either a linear structure or a branched structure.

The electrolyte salt in the electrolyte solution preferably has a concentration of 0.5 to 3 mol/L. The electrolyte salt having a concentration outside this range tends to cause a low electric conductivity of the electrolyte solution, impairing the battery performance.

The concentration of the electrolyte salt is more preferably 0.9 mol/L or higher and 1.5 mol/L or lower.

The electrolyte salt in the electrolyte solution to an electric double layer capacitor is preferably an ammonium salt, Examples of the ammonium salt include the following salts (IIa) to (IIe).

(IIa) Tetraalkyl Quaternary Ammonium Salts

Preferred examples thereof include tetraalkyl quaternary ammonium salts represented by the following formula (IIa).

[chem. 27]

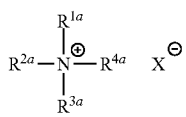

(IIa)

(wherein $R^{1a}$, $R^{2a}$, $R^{3a}$, and $R^{4a}$ are the same as or different from each other, and are each a C1-C6 alkyl group which optionally has an ether bond; and $X^-$ is an anion). In order to improve the oxidation resistance, any or all of the hydrogen atoms in the ammonium salt are also preferably replaced by a fluorine atom and/or a C1-C4 fluorine-containing alkyl group.

Preferred specific examples of the tetraalkyl quaternary ammonium salts include tetraalkyl quaternary ammonium salts represented by the following formula (IIa-1):

[chem. 28]

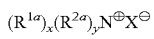

(IIa-1)

wherein $R^{1a}$, $R^{2a}$, and $X^-$ are defined in the same manner as mentioned above; x and y are the same as or different from each other, and are each an integer of 0 to 4 with x+y=4, and alkyl ether group-containing trialkyl ammonium salts represented by the following formula (IIa-2):

[chem. 29]

wherein $R^{5a}$ is a C1-C6 alkyl group; $R^{6a}$ is a C1-C6 divalent hydrocarbon group; $R^{7a}$ is a C1-C4 alkyl group; z is 1 or 2; and $X^-$ is an anion.

Introduction of an alkyl ether group may reduce the viscosity.

The anion $X^-$ may be either an inorganic anion or an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

In order to achieve good oxidation resistance and ionic dissociation, $BF_4^-$, $PF_6^-$, $AsF_6^-$, and $SbF_6^-$ are preferred.

Preferred specific examples of the tetraalkyl quaternary ammonium salts include $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, $Et_3MeNC_4F_9SO_3$, and an N,N-diethyl-N-methyl-N-(2-methoxyethyl)ammonium salt. In particular, $Et_4NBF_4$, $Et_4NPF_6$, $Et_4NSbF_6$, $Et_4NAsF_6$, $Et_3MeNBF_4$, and an N,N-diethyl-N-methyl-N-(2-methoxyethyl)ammonium salt are preferred.

(IIb) Spirocyclic Bipyrrolidinium Salts

Preferred examples thereof include spirocyclic bipyrrolidinium salts represented by the following formula (IIb-1):

[chem. 30]

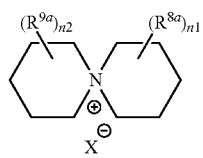

(IIb-1)

wherein $R^{8a}$ and $R^{9a}$ are the same as or different from each other, and are each a C1-C4 alkyl group; X is an anion; n1 is an integer of 0 to 5; and n2 is an integer of 0 to 5, spirocyclic bipyrrolidinium salts represented by the following formula (IIb-2):

[chem. 31]

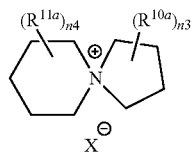

(IIb-2)

wherein $R^{10a}$ and $R^{11a}$ are the same as or different from each other, and are each a C1-C4 alkyl group; $X^-$ is an anion; n3 is an integer of 0 to 5; and n4 is an integer of 0 to 5, and spirocyclic bipyrrolidinium salts represented by the following formula (IIb-3):

[chem. 32]

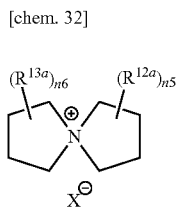

(IIb-3)

wherein $R^{12a}$ and $R^{13a}$ are the same as or different from each other, and are each a C1-C4 alkyl group; $X^-$ is an anion; n5 is an integer of 0 to 5; and n6 is an. integer of 0 to 5.

In order to improve the oxidation resistance, any or all of the hydrogen atoms in the spirocyclic bipyrrolidinium salt are also preferably replaced by a fluorine atom and/or a C1-C4 fluorine-containing alkyl group.

Preferred specific examples of the anion $X^-$ are the same as those mentioned for the salts (IIa). In order to achieve good dissociation and a low internal resistance under high voltage, $BF_4^-$, $PF_6^-$, $(CF_3SO_2)_2N^-$, or $(C_2F_5SO_2)_2N^-$ is particularly preferred.

For example, those represented by the following formulas:

[chem. 33]

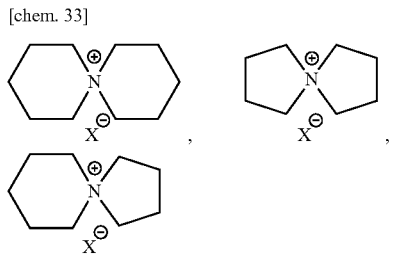

may be mentioned as preferred specific examples of the spirocyclic bipyrrolidinium salts.

These spirocyclic bipyrrolidinium salts are excellent in solubility in a solvent, oxidation resistance, and ion conductivity.

(IIc) Imidazolium Salts

Preferred examples thereof include imidazolium salts represented by the following formula (IIc):

[chem. 34]

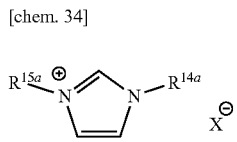

(IIc)

wherein $R^{14a}$ and $R^{15a}$ are the same as or different from each other, and are each a C1-C6 alkyl group; and $X^-$ is an anion.

In order to improve the oxidation resistance, any or all of the hydrogen atoms in the imidazolium salt are also preferably replaced by a fluorine atom and/or a C1-C4 fluorine-containing alkyl group.

Preferred specific examples of the anion X are the same as those mentioned for the salts (IIa).

For example, one represented by the following formula:

[chem. 35]

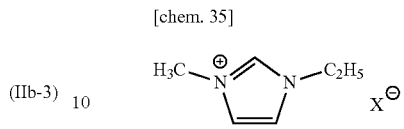

may be mentioned as a preferred specific example of the imidazolium salt.

This imidazolium salt is excellent in that it has low viscosity and good solubility.

(IId): N-alkylpyridinium Salts

Preferred examples thereof include N-alkylpyridinium salts represented by the following formula (IId):

[chem. 36]

(IId)

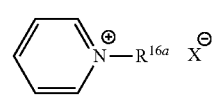

wherein $R^{16a}$ is a C1-C6 alkyl group; and $X^-$ is an anion.

In order to improve the oxidation resistance, any or all of the hydrogen atoms in the N-alkylpyridinium salt are also preferably replaced by a fluorine atom and/or a C1-C4 fluorine-containing alkyl group.

Preferred specific examples of the anion $X^-$ are the same as those mentioned for the salts (IIa).

For example, those represented by the following formulas:

[chem. 37]

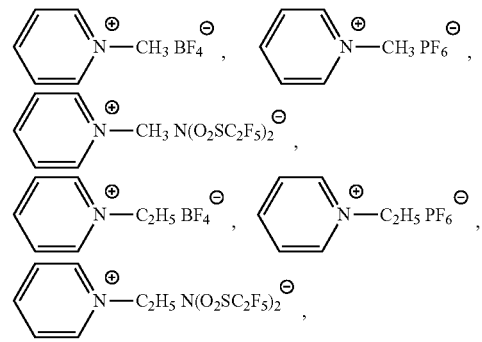

may be mentioned as preferred specific examples of the N-alkylpyridinium salts.

These N-alkylpyrldinium salts are excellent in that they have low viscosity and good solubility.

(IIe) N,N-dialkylpyrrolidinium Salts

Preferred examples thereof include N,N-dialkylpyrrolidinium salts represented by the following formula (IIe):

[chem. 38]

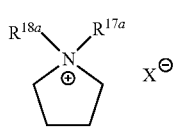

(IIe)

wherein $R^{17a}$ and $R^{18a}$ are the same as or different from each other, and are each a C1-C6 alkyl group; and $X^-$ is an anion.

In order to improve the oxidation resistance, any or all of the hydrogen atoms in the N,N-dialkylpyrrolidinium salt are also preferably replaced by a fluorine atom and/or a C1-C4 fluorine-containing alkyl group.

Preferred specific examples of the anion $X^-$ are the same as those mentioned for the salts (IIa).

For example, those represented by the following formulas:

[chem. 39]

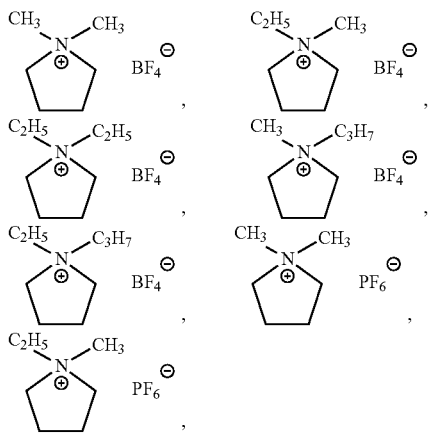

[chem. 40]

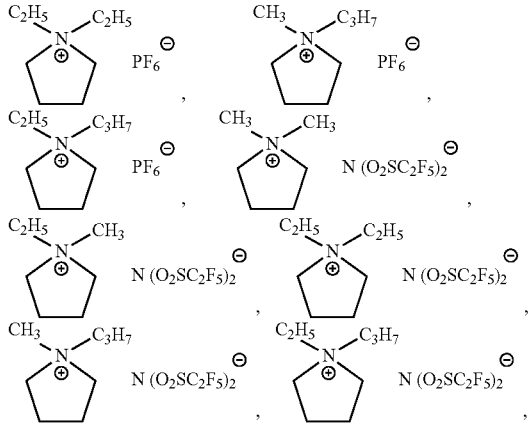

may be mentioned as preferred specific examples of the N,N-dialkylpyrrolidinium salts.

These N,N-dialkylpyrrolidinium salts are excellent in that they have low viscosity and good solubility.

Preferred among these ammonium salts are those represented by the formula (IIa), (IIb), or (IIc) because they have good solubility, oxidation resistance, and ion conductivity. More preferred are those represented by the following formulas:

[chem. 41]

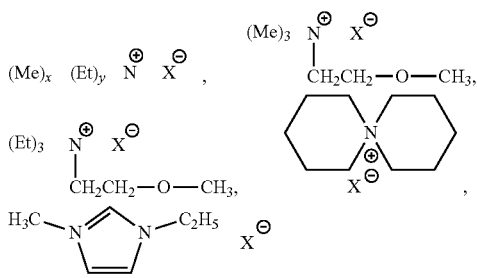

wherein Me is a methyl group; Et is an ethyl group; and $X^-$, x, and y are defined in the same manner as in the formula (IIa-1).

A lithium salt may be used as an electrolyte salt for electric double layer capacitors. Preferred examples thereof include $LiPF_6$, $LiBF_4$, $LiAsF_6$, $LiSbF_6$, and $LiN(SO_2C_2H_5)_2$.

In order to further increase the capacity, a magnesium salt may be used. Preferred examples of the magnesium salt include $Mg(ClO_4)_2$ and $Mg(OOC_2H_5)_2$.

The ammonium salt serving as an electrolyte salt is preferably used at a concentration of 0.6 mol/L or higher. The ammonium salt at a concentration lower than 0.6 mol/L may cause not only poor low temperature performance but also a high initial internal resistance. The concentration of the electrolyte salt is more preferably 0.9 mol/L or higher.

In order to achieve good low-temperature performance, the upper limit of the concentration is preferably 3.0 mol/L or lower, more preferably 2.0 mol/L or lower.

In order to achieve excellent low-temperature performance, the ammonium salt which is triethyl methyl ammonium tetrafluoroborate ($TEMABF_4$) is preferably used at a concentration of 0.8 to 1.9 mol/L.

Spirobipyrrolidinium tetrafluoroborate ($SBPBF_4$) is preferably used at a concentration of 0.7 to 2.0 mol/L.

The electrolyte solution of the invention preferably further includes polyethylene oxide that has a weight average molecular weight of 2000 to 4000 and has —OH, —OCOOH, or —COOH at an end.

The presence of such a compound can improve the stability at the interfaces with the respective electrodes, improving the battery performance.

Examples of the polyethylene oxide include polyethylene oxide monool, polyethylene oxide carboxylate, polyethylene oxide dial, polyethylene oxide dicarboxylate, polyethylene oxide triol, and polyethylene oxide tricarboxylate. These may be used alone or in combination of two or more.

In order to achieve good battery performance, preferred are a mixture of polyethylene oxide monool and polyethylene oxide dial and a mixture of polyethylene oxide carboxylate and polyethylene oxide dicarboxylate are preferred.

The polyethylene oxide having too small a weight average molecular weight may be easily oxidatively decomposed. The weight average molecular weight is more preferably 3000 to 4000.

The weight average molecular weight can be determined by gel permeation chromatography (GPC) in terms of polystyrene equivalent.

The amount of the polyethylene oxide is preferably $1 \times 10^{-6}$ to $1 \times 10^{-2}$ mol/kg in the electrolyte solution. Too large an amount of the polyethylene oxide may cause poor battery performance.

The amount of the polyethylene oxide is more preferably $5 \times 10^{-6}$ mol/kg or more.

The electrolyte solution of the invention preferably further contains, as an additive, at least one selected from the group consisting of an unsaturated cyclic carbonate, a fluorinated saturated cyclic carbonate, and a cyclic sulfonate compound. The presence of such a compound can reduce impairment of the battery performance.

The unsaturated cyclic carbonate is a cyclic carbonate having an unsaturated bond, i.e., a cyclic carbonate having at least one carbon-carbon unsaturated bond in the molecule. Specific examples thereof include vinylene carbonate compounds such as vinylene carbonate, methyl vinylene carbonate, ethyl vinylene carbonate, 4,5-dimethyl vinylene carbonate, and 4,5-diethyl vinylene carbonate; and vinyl ethylene carbonate compounds such as 4-vinyl ethylene carbonate (VEC), 4-methyl-4-vinyl ethylene carbonate, 4-ethyl-4-vinyl ethylene carbonate, 4-n-propyl-4-vinylene ethylene carbonate, 5-methyl-4-vinyl ethylene carbonate, 4,4-divinyl ethylene carbonate, 4,5-divinyl ethylene carbonate, 4,4-dimethyl-5-methylene ethylene carbonate, and 4,4-diethyl-5-methylene ethylene carbonate. Preferred among these is vinylene carbonate, 4-vinyl ethylene carbonate, 4-methyl-4-vinyl ethylene carbonate, or 4,5-divinyl ethylene carbonate, and particularly preferred is vinylene carbonate or 4-vinyl ethylene carbonate.

The unsaturated cyclic carbonate may have any molecular weight that does not significantly impair the effects of the invention. The molecular weight is preferably 50 or higher and 250 or lower. The unsaturated cyclic carbonate having a molecular weight within this range is likely to ensure its solubility in the electrolyte solution and to enable sufficient achievement of the effects of the invention. The molecular weight of the unsaturated cyclic carbonate is more preferably 80 or higher, while more preferably 150 or lower.

The unsaturated cyclic carbonate may also be preferably a fluorinated unsaturated cyclic carbonate.

The number of fluorine atoms in the fluorinated unsaturated cyclic carbonate may be any number that is 1 or greater. The number of fluorine atoms is usually 6 or smaller, preferably 4 or smaller, most preferably 1 or 2.

Examples of the fluorinated unsaturated cyclic carbonate include fluorinated vinylene carbonate derivatives and fluorinated ethylene carbonate derivatives substituted with a substituent having an aromatic ring or a carbon-carbon double bond.

Examples of the fluorinated vinylene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate, and 4-fluoro-5-vinyl vinylene carbonate.

Examples of the fluorinated ethylene carbonate derivatives substituted with a substituent having an aromatic ring or a carbon-carbon double bond include 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, 4,5-difluoro-4,5-diallyl ethylene carbonate, 4-fluoro-4-phenyl ethylene carbonate, 4-fluoro-5-phenyl ethylene carbonate, 4,4-difluoro-5-phenyl ethylene carbonate, and 4,5-difluoro-4-phenyl ethylene carbonate.

The fluorinated unsaturated cyclic carbonate may have any molecular weight that does not significantly impair the effects of the invention. The molecular weight is preferably 50 or higher and 500 or lower. The fluorinated unsaturated cyclic carbonate having a molecular weight within this range is likely to ensure the solubility of the fluorinated unsaturated cyclic carbonate in the electrolyte solution and to enable sufficient achievement of the effects of the invention.

The unsaturated cyclic carbonates may be used alone or in any combination of two or more at any ratio.

Examples of the fluorinated saturated cyclic carbonate include the compounds mentioned as examples of the fluorinated saturated cyclic carbonate to be used in the solvent.

Examples of the cyclic sulfonate compound include 1,3-propanesultone, 1,4-butanesultone, 1-fluoro-1,3-propanesultone, 2-fluoro-1,3-propanesultone, and 3-fluoro-1,3-propanesultone.

In order to improve the high-temperature performance, the electrolyte solution of the invention preferably contains 1,3-propanesultone and/or 1,4-butanesultone.

It at least one compound selected from the group consisting of the unsaturated cyclic carbonate, the fluorinated saturated cyclic carbonate, and the cyclic sulfonate compound is used as an additive, the amount thereof in the electrolyte solution is preferably 0.1 to 10 mass n, more preferably 1 mass % or more, while more preferably 5 mass % or less.

The electrolyte solution of the invention may further contain any other solvent or additive such as a cyclic or acyclic carboxylate, an ether compound, a nitrogen-containing compound, a boron-containing compound, an organosilicon-containing compound, a fireproof agent (flame retardant), a surfactant, an additive for increasing the permittivity, an improver for cycle performance or rate performance, and an overcharge inhibitor, to the extent that does not deteriorate the effects of the invention.

Examples of the cyclic carboxylate include those having a carbon number of 3 to 12 in total in the structural formula. Specific examples thereof include gamma-butyrolactone, gamma-valerolactone, gamma-caprolactone, and epsilon-caprolactone. In order to improve the battery performance owing to improvement in the degree of dissociation of lithium ions, gamma-butyrolactone is particularly preferred.

In general, the amount of the cyclic carboxylate is preferably 0.1 mass % or more, more preferably 1 mass % or more, in 100 mass % of the solvent. The cyclic carboxylate in an amount within this range is likely to improve the electric conductivity of the electrolyte solution, improving the large-current discharge performance of an electrolyte battery. The amount of the cyclic carboxylate is also preferably 10 mass % or less, more preferably 5 mass % or less. Such an upper limit may allow the electrolyte solution to have a viscosity within an appropriate range, may make it possible to avoid a reduction in the electric conductivity, may reduce an increase in the resistance of the negative electrode, and may allow the electrolyte battery to have large-current discharge performance within a favorable range.

The cyclic carboxylate to be suitably used may also be a fluorinated cyclic carboxylate (fluorolactone). Examples of the fluorolactone include fluorolactones represented by the following formula. (C):

[chem. 42]

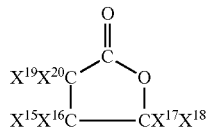

(C)

wherein $X^{15}$ to $X^{20}$ are the same as or different from each other, and are each —H, —F, —Cl, —CH$_3$, or a fluorinated alkyl group; and at least one of $X^{15}$ to $X^{20}$ is a fluorinated alkyl group.

Examples of the fluorinated alkyl group for $X^{15}$ to $X^{20}$ include —CFH$_2$, —CF$_2$H, —CF$_3$, —CH$_2$CF$_3$, —CF$_2$CF$_3$, —CH$_2$CF$_2$CF$_3$, and —CF(CF$_3$)$_2$. In order to achieve high oxidation resistance and an effect of improving the safety, —CH$_2$CF$_3$ and —CH$_2$CF$_2$CF$_3$ are preferred.

One of $X^{16}$ to $X^{20}$ or a plurality thereof may be replaced by —H, —F, —Cl, —CH$_3$, or a fluorinated alkyl group only when at least one of $X^{15}$ to $X^{20}$ is a fluorinated alkyl group. In order to achieve good solubility of the electrolyte salt, the number of substituents is preferably 1 to 3, more preferably 1 or 2.

The substitution may be at any of the above sites in the fluorinated alkyl group. In order to achieve a good synthesizing yield, the substitution site is preferably $X^{17}$ and/or $X^{18}$. In particular, $X^{17}$ or $X^{18}$ is preferably a fluorinated alkyl group, especially, —CH$_2$CF$_3$ or —CH$_2$CF$_2$CF$_3$. The substituent for $X^{15}$ to $X^{20}$ other than the fluorinated alkyl group is —H, —F, —Cl, or CH$_3$. In order to achieve good solubility of the electrolyte salt, —H is preferred.

In addition to those represented by the above formula, the fluorolactone may also be a fluorolactone represented by the following formula (D):

[chem. 43]

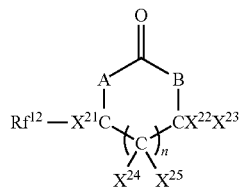

(D)

wherein one of A and B is CX$^{26}$X$^{27}$ (where X$^{26}$ and X$^{27}$ are the same as or different from each other, and are each —H, —F, —Cl, —CF$_3$, —CH$_3$, or an alkylene group in which a hydrogen atom is optionally replaced by a halogen atom and which optionally has a hetero atom in the chain) and the other is an oxygen atom; Rf$^{12}$ is a fluorinated alkyl group or fluorinated alkoxy group which optionally has an ether bond; X$^{21}$ and X$^{22}$ are the same as or different from each other, and are each —H, —F, —Cl, —CF$_3$, or CH$_3$; X$^{23}$ to X$^{25}$ are the same as or different from each other, and are each —H, —F, —Cl, or an alkyl group in which a hydrogen atom is optionally replaced by a halogen atom and which optionally contains a hetero atom in the chain; and n=0 or 1.

A preferred example of the fluorolactone represented by the formula (D) is a 5-membered ring structure represented by the following formula (E):

[chem. 44]

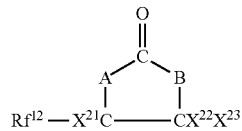

(E)

(wherein A, B, Rf$^{12}$, X$^{21}$, X$^{22}$, and X$^{23}$ are defined in the same manner as in the formula (D)) because it is easy to synthesize and has good chemical stability. Further, in relation to the combination of A and B, fluorolactones represented by the following formula (F):

[chem. 45]

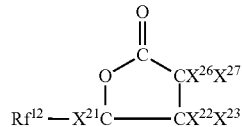

(F)

(wherein Rf$^{12}$, X$^{21}$, X$^{22}$, X$^{23}$, X$^{26}$, and X$^{27}$ are defined in the same manner as in the formula (D)) and fluorolactones represented by the following formula (G):

[chem. 46]

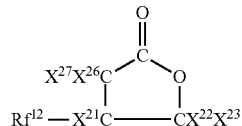

(G)

(wherein Rf$^{12}$, X$^{21}$, X$^{22}$, X$^{23}$, X$^{26}$, and X$^{27}$ are defined in the same manner as in the formula (D) may be mentioned.

In order to particularly achieve excellent characteristics such as a high permittivity and a high withstand voltage, and to improve the characteristics of the electrolyte solution in the invention, for example, to achieve good solubility of the electrolyte salt and to reduce the internal resistance well, those represented by the following formulas:

[chem. 47]

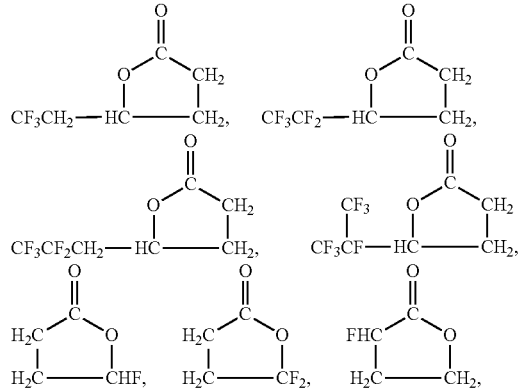

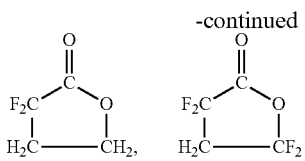

may be mentioned.

The presence of a fluorinated cyclic carboxylate can lead to, for example, effects of improving the ion conductivity, improving the safety, and improving the stability at high temperature.

Examples of the acyclic carboxylate include those having a carbon number of 3 to 7 in total in the structural formula. Specific examples thereof include methyl acetate, ethyl acetate, n-propyl acetate, isopropyl acetate, n-butyl acetate, isobutyl acetate, t-butyl,acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, n-propyl butyrate, isopropyl butyrate, methyl isobutyrate, ethyl isobutyrate, n-propyl isobutyrate, and isopropyl isobutyrate.

In order to improve the ion conductivity owing to reduction in viscosity, preferred are methyl acetate, ethyl acetate, n-propyl acetate, n-butyl acetate, methyl propionate, ethyl propionate, n-propyl propionate, isopropyl propionate, methyl butyrate, and ethyl butyrate, for example.

Also, a fluorinated acyclic carboxylate (fluorine-containing ester) may also suitably be used. The fluorine-containing ester is preferably a fluorinated acyclic carboxylate represented by the following formula (H):

$$Rf^{10}COORf^{11} \qquad (H)$$

(wherein $Rf^{10}$ is a C1-C2 fluorinated alkyl group; and $Rf^{11}$ is a C1-C4 fluorinated alkyl group) because it has high flame retardance, good compatibility with other solvents, and good oxidation resistance.

Examples of $Rf^{10}$ include $CF_3$—, $CF_3CF_7$—, $HCF_2CF_2$—, $HCF_2$—, $CH_3CF_2$—, and $CF_3CH_2$—. In order to achieve good rate performance, $CF_3$— and $CF_3CF_2$— are particularly preferred.

Examples of $Rf^{11}$ include —$CF_3$, —$CF_2CF_3$, —$CH(CF_3)_2$, —$CH_2CF_3$, —$CH_2CH_2CF_3$, —$CH_2CF_2CFHCF_3$, —$CH_2C_2F_5$, —$CH_2CF_2CF_2H$, —$CH_2CH_2C_2F_5$, —$CH_2CF_2CF_3$, and —$CH_2CF_2CF_2CF_3$. In order to achieve good compatibility with other solvents, —$CH_2CF_3$, —$CH(CF_3)_2$, —$CH_2C_2F_5$, and —$CH_2CF_2CF_2H$ are particularly preferred.

Specifically, for example, the fluorinated acyclic carboxylate may include one or two or more of $CF_3C(=O)OCH_2CF_3$, $CF_3C(=O)OCH_2CH_2CF_3$, $CF_3C(=O)OCH_2C_2F_5$, $CF_3C(=O)OCH_2CF_2CF_2H$, and $CF_3C(=O)OCH(CF_3)_2$. In order to achieve good compatibility with other solvents and good rate performance, $CF_3C(=O)OCH_2C_2F_5$, $CF_3C(=O)OCH_2CF_2CF_2H$, $CF_3C(=O)OCH_2CF_3$, and $CF_3C(=O)OCH(CF_3)_2$ are particularly preferred.

The ether compound is preferably a C3-C10 acyclic ether or a C3-C6 cyclic ether.

Examples of the C3-C10 acyclic ether include diethyl ether, di-n-butyl ether, dimethoxy methane, methoxy ethoxy methane, diethoxy methane, dimethoxy ethane, methoxy ethoxy ethane, diethoxy ethane, ethylene glycol di-n-propyl ether, ethylene glycol di-n-butyl ether, and diethylene glycol dimethyl ether.

Further, the ether compound may also suitably be a fluorinated ether.

An example of the fluorinated ether is a fluorinated ether (I) represented by the following formula (I):

(wherein $Rf^{13}$ and $Rf^{14}$ are the same as or different from each other, and each are a C1-C10 alkyl group or a C1-C10 fluorinated alkyl group; and at least one of $Rf^{13}$ and $Rf^{14}$ is a C1-C10 fluorinated alkyl group). The presence of the fluorinated ether (I) can improve the incombustibility of the electrolyte solution, as well as improve the stability and safety at high temperature under high voltage.

In the formula (I), at least one of $Rf^{13}$ and $Rf^{14}$ has only to be a C1-C10 fluorinated alkyl group. In order to further improve the incombustibility and the stability and safety at high temperature under high voltage of the electrolyte solution, both $Rf^{13}$ and $Rf^{14}$ are preferably a C1-C10 fluorinated alkyl group. In this case, $Rf^{13}$ and $Rf^{14}$ are the same as or different from each other.

Particular preferably, $Rf^{13}$ and $Rf^{14}$ are the same as or different from each other, and $Rf^{13}$ is a C3-C6 fluorinated alkyl group and $Rf^{14}$ is a C2-C6 fluorinated alkyl group.

If the sum of the carbon numbers of $Rf^{13}$ and $Rf^{14}$ is too small, the fluorinated ether may have too low a boiling point. Too large a carbon number of $Rf^{13}$ or $Rf^{14}$ may cause low solubility of the electrolyte salt, may start to adversely affect the compatibility with other solvents, and may cause high viscosity, resulting in poor rate performance (viscousness). In order to achieve an excellent boiling point and rate performance, advantageously, the carbon number of $Rf^{13}$ is 3 or 4 and the carbon number of $Rf^{14}$ is 2 or 3.

The fluorinated ether (I) preferably has a fluorine content of 40 to 75 mass %. The fluorinated ether (I) having a fluorine content within this range may lead to particularly excellent balance between the incombustibility and the compatibility. The above range is also preferred for good oxidation resistance and safety.

The lower limit of the fluorine content is more preferably 45 mass %, still more preferably 50 mass %, particularly preferably 55 mass %. The upper limit thereof is more preferably 70 mass %, still more preferably 66 mass %.

The fluorine content of the fluorinated ether (I) is a value calculated based on the structural formula of the fluorinated ether (I) by the following formula: {(number of fluorine atoms×19)/(molecular weight of fluorinated ether (I))}×100 (%).

Examples of $Rf^{13}$ include $CF_3CF_2CH_2$—, $CF_3CFHCF_2$—, $HCF_2CF_2CF_2$—, $HCF_2CF_2CH_2$—, $CF_3CF_2CH_2CH_2$—, $CF_3CFHCF_2CH_2$—, $HCF_2CF_2CF_2CF_2$—, $HCF_2CF_2CF_2CH_2$—, $HCF_2CF_2CH_2CH_2$—, and $HCF_2CF(CF_3)CH_2$—. Examples of $Rf^{14}$ include —$CH_2CF_2CF_3$, —$CF_2CFHCF_3$, —$CF_2CF_2CF_2H$, —$CH_2CF_2CF_2H$, —$CH_2CH_2CF_2CF_3$, —$CH_2CF_2CFHCF_3$, —$CF_2CF_2CF_2CF_2H$, —$CH_2CF_2CF_2CF_3$, —$CH_2CH_2CF_2CF_2H$, —$CH_2CF(CF_3)CF_2H$, —$CF_2CF_2H$, —$CH_2CF_2H$, and —$CF_2CH_3$.

Specific examples of the fluorinated ether (I) include $HCl_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_9F_{17}OC_2H_5$, $CF_3CFHCF_2CH(CH_3)OCF_2CFHCF_3$, $HCF_2CF_2OCH(C_2H_5)_2$, $HCF_2CF_2OC_4H_9$, $HCF_2CF_2OCH_2CH(C_2H_5)_2$, and $HCF_2CF_2OCH_2CH(CH_3)_2$.

In particular, those having $HCF_2$— or $CF_3CFH$— at one end or both ends can provide a fluorinated ether (I) having excellent polarizability and a high boiling point. The boiling point of the fluorinated ether (I) is preferably 67° C. to 120° C., more preferably 80° C. or higher, still more preferably 90° C. or higher.

Such a fluorinated ether (I) may include one or two or more of $CF_3CH_2OCF_2CFHCF_3$, $CF_3CF_2CH_2OCF_2CFHCF_3$, $HCF_2CF_2CH_2OCF_2CFHCF_3$, $HCF_2CF_2CH_2OCH_2CF_2CF_2H$, $CF_3CFHCF_2CH_2OCF_2CFHCF_3$, $HCF_2CF_2CH_2OCF_2CF_2H$, $CF_3CF_2CH_2OCF_2CF_2H$, and the like.

The fluorinated either (I) is preferably at least one selected from the group consisting of $HCF_2CF_2CH_2OCF_2CFHCF_3$ (boiling point: 106° C.), $CF_3CF_2CH_2OCF_2CFHCF_3$ (boiling point: 82° C.), $HCF_2CF_2CH_2OCF_2CF_2H$ (boiling point: 92° C.), and $CF_3CF_2CH_2OCF_2CF_2H$ (boiling point: 68° C.), more preferably at least one selected from the group consisting of $HCF_2CF_2CH_2OCF_2CFHCF_3$ (boiling point: 106° C.), and $HCF_2CF_2CH_2OCF_2CF_2H$ (boiling point: 92° C.), because they advantageously have a high boiling point and good compatibility,with other solvents, and lead to good solubility of the electrolyte salt.

Examples of the C3-C6 cyclic ether include 1,3-dioxane, 2-methyl-1, 3-dioxane, 4-methyl-1,3-dioxane, 1,4-dioxane, and fluorinated compounds thereof. Preferred are dimethoxy methane, diethoxy methane, ethoxy methoxy methane, ethylene glycol n-propyl ether, ethylene glycol di-n-butyl ether, and diethylene glycol dimethyl ether because they have a high ability to solvate with lithium ions and improve the degree of ion dissociation. Particularly preferred are dimethoxy methane, diethoxy methane, and ethoxy methoxy methane because they have low viscosity and give a high ion conductivity.

Examples of the nitrogen-containing compound include nitrile, fluorine-containing nitrile, carboxylic acid amide, fluorine-containing carboxylic acid amide, sulfonic acid amide, and fluorine-containing sulfonic acid amide. Also, 1-methyl-2-pyrrolidinone, 1-methyl-2-piperidone, 3-methyl-2-oxazilidinone, 1,3-dimethyl-2-imidazolidinone, and N-methylsuccinimide may be used.

Examples of the boron-containing compound include borates such as trimethyl borate and triethyl borate, boric acid ethers, and alkyl borates.

Examples of the organosilicon-containing compound include $(CH_3)_4$—Si and $(CH_3)_3$—Si—Si$(CH_3)_3$.

Examples of the fireproof agent (flame retardant) include organophosphates and phosphazene-based compounds. Examples of the organophosphates include fluoroalkyl phosphates, non-fluoroalkyl phosphates, and aryl phosphates. In order to achieve a flame retardant effect even at a small amount, fluoroalkyl phosphates are particularly preferred.

Specific examples of the fluoroalkyl phosphates include fluorodialkyl phosphates disclosed in JP H11-233141 A, alkyl phosphates disclosed in JP H11-283669 A, and fluorotrialkyl phosphates.

Preferred examples of the fireproof agent (flame retardant) include $(CH_3O)_3P=O$ and $(CF_3CH_2O)_3P=O$.

The surfactant may be any of cationic surfactants, anionic surfactants, nonionic surfactants, and amphoteric surfactants. In order to achieve good cycle performance and rate performance, the surfactant is preferably one containing a fluorine atom.

Preferred examples of such a surfactant containing a fluorine atom include fluorine-containing carboxylic acid salts represented by the following formula (J):

(wherein $Rf^{15}$ is a C3-C10 fluorine-containing alkyl group which optionally has an ether bond; $M^+$ is $Li^+$, $Na^+$, $K^+$, or $NHR'_3^+$, wherein R's are the same as or different from each other, and are each H or a C1-C3 alkyl group), and fluorine-containing sulfonic acid salts represented by the following formula (K):

(wherein $Rf^{16}$ is a C3-C10 fluorine-containing alkyl group which optionally has an ether bond; $M^+$ is $Li^+$, $Na^+$, $K^+$, or $NHR'_3^+$, wherein R's are the same as or different from each other, and are each H or a C1-C3 alkyl group).

In order to reduce the surface tension of the electrolyte solution without impairing the charge and discharge cycle performance, the amount of the surfactant is preferably 0.01 to 2 mass % in the electrolyte solution.

Examples of the additive for increasing the permittivity include sulfolane, methyl sulfolane, γ-butyrolactone, γ-valerolactone, acetonitrile, and propionitrile.

Examples of the improver for cycle performance and rate performance include methyl acetate, ethyl acetate, tetrahydrofuran, and 1,4-dioxane.

In order to reduce burst or combustion of batteries in case of overcharge, for example, the overcharge inhibitor is preferably an overcharge inhibitor having an aromatic ring. Examples of the overcharge inhibitor having an aromatic ring include aromatic compounds such as cyclohexyl benzene, biphenyl, alkyl biphenyl, terphenyl, partially hydrogenated terphenyl, t-butyl benzene, t-amyl benzene, diphenyl ether, benzofuran, dibenzofuran, dichloroaniline, and toluene; fluorinated aromatic compounds such as hexafluorobenzene, fluorobenzene, 2-fluorobiphenyl, o-cyclohexyl fluorobenzene, and p-cyclohexyl fluorobenzene; and fluoroanisole compounds such as 2,4-difluoroanisole, 2,5-difluoroanisole, 2,6-difluoroanisole, and 3,5-difluoroanisole. Preferred are aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran. These compounds may be used alone or in combination of two or more. For combination use of two or more compounds, in order to achieve good balance between the overcharge inhibiting performance and the high-temperature storage performance, preferred is a combination of cyclohexyl benzene and t-butyl benzene or t-amyl benzene, or a combination of at least one oxygen-free aromatic compound selected from biphenyl, alkyl biphenyl, terphenyl, partially hydrogenated terphenyl, cyclohexyl benzene, t-butyl benzene, t-amyl benzene, or the like and at least one oxygen-containing aromatic compound selected from diphenyl ether, dibenzofuran, or the like.

In order to prevent burst and combustion of batteries in case of overcharge, for example, the amount of the overcharge inhibitor is preferably 0.1 to 5 mass % in the electrolyte solution.

The electrolyte solution of the invention may further contain other known assistants to the extent that does not impair the effects of the invention. Examples of such known assistants include carbonate compounds such as erythritan carbonate, spiro-bis-dimethylene carbonate, and methoxy ethyl-methyl carbonate; carboxylic anhydrides such as succinic anhydride, glutanic anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; sulfur-containing compounds such as acyclic sulfones, fluorine-containing acyclic sulfones, acyclic sulfonic acid esters, fluorine-containing acyclic sulfonic acid esters, cyclic sulfones, fluorine-containing cyclic sulfones, sulfonic halides, and fluorine-containing sulfonic halides, including ethylene sulfite, methyl fluorosulfonate, ethyl fluorosulfonate, methyl methanesulfonate, ethyl methanesulfonate, busulfan, sulfolene, diphenyl sulfone, N,N-dimethylmethanesulfonamide, and N,N-diethylmethanesulfonamide; and fluorine-containing aromatic compounds of hydrocarbon compounds such as heptane, octane, nonane, decane, and cycloheptane. These compounds may be used alone or in combination of two or more. These assistants can improve the capacity retention performance and the cycle performance after high-temperature storage.

The electrolyte solution of the invention may be combined with a polymer material and thereby formed into a gel-like (plasticized), gel electrolyte solution.

Examples of such a polymer material include conventionally known polyethylene oxide and polypropylene oxide, and modified products thereof (see JP H08-222270 A, JP 2002-100405 A); polyacrylate-based polymers, polyacrylonitrile, and fluororesins such as polyvinylidene fluoride and vinylidene fluoride-hexafluoropropylene copolymers (see JP H04-506726 T, JP H08-507407 T, JP H10-294131 A); and composites of any of these fluororesins and any hydrocarbon resin (see JP 2111-35765 A, JP N11-86630 A). In particular, polyvinylidene fluoride or a vinylidene fluoride-hexafluoropropylene copolymer is preferably used as a polymer material for gel electrolytes.

The electrolyte solution of the invention may also contain an ion conductive compound disclosed in Japanese Patent Application No. 2004-301934.

This ion conductive compound is an amorphous fluoropolyether compound having a fluorine-containing group at a side chain and is represented by the following formula (1-1)

$$A\text{-}(D)\text{-}B \quad (1\text{-}1)$$

wherein D is represented by the following formula (2-1):

$$\text{-}(D1)_n\text{-}(FAE)_m\text{-}(AE)_p\text{-}(Y)_q\text{—} \quad (2\text{-}1)$$

(wherein D1 is an ether unit having a fluoroether group at a side chain and is represented by the following formula. (2a):

[chem. 48]

(wherein Rf is a fluoroether group which optionally has a crosslinkable functional group; and $R^{10}$ is a group or a bond that links Rf and the main chain);

FAE is an ether unit having a fluorinated alkyl group at a side chain and is represented by the following formula (2b):

[chem. 49]

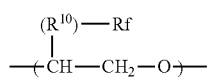

(wherein Rfa is a hydrogen atom or a fluorinated alkyl group which optionally has a crosslinkable functional group; and $R^{11}$ is a group or a bond that links Rfa and the main chain);

AE is an ether unit represented by the following formula (2c):

[chem. 50]

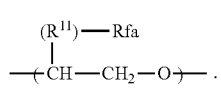

(wherein $R^{13}$ is a hydrogen atom, an alkyl group which optionally has a crosslinkable functional group, an aliphatic cyclic hydrocarbon group which optionally has a crosslinkable functional group, or an aromatic hydrocarbon group which optionally has a crosslinkable functional group; and $R^{12}$ is a group or a bond that links $R^{13}$ and the main chain);

Y is a unit having at least one selected from the following formulas (2d-1) to (2d-3):

[chem. 51]

n is an integer of 0 to 200;
m is an integer of 0 to 200;
p is an integer of 0 to 10000;
q is an integer of 1 to 100;
n+m is not 0; and
the bonding order of D1, FAE, AE, and Y is not specified); and A and B are the same as or different from each other, and are each a hydrogen atom, an alkyl group which optionally has a fluorine atom and/or a crosslinkable functional group, a phenyl group which optionally has a fluorine atom and/or a crosslinkable functional group, a —COOH group, —OR (where R is a hydrogen atom or an alkyl group which optionally has a fluorine atom and/or a crosslinkable functional group), an ester group, or a carbonate group (if an end of D is an oxygen atom, A and B each are none of a —COOH group, —OR, an ester group, and a carbonate group).

The electrolyte solution of the invention may further contain other additives, if necessary. Examples of such other additives include metal oxides and glass.

The electrolyte solution of the invention may be prepared by any method using the aforementioned components.

The electrolyte solution of the invention can be suitably applied to electrochemical devices such as secondary batteries. Such an electrochemical device including the electrolyte solution of the invention is also one aspect of the invention.

Examples of the electrochemical devices include lithium ion secondary batteries, capacitors (electric double-layer capacitors), radical batteries, solar cells (in particular, dyesensitized solar cells), fuel cells, various electrochemical sensors, electrochromic elements, electrochemical switching elements, aluminum electrolytic capacitors, and tantalum electrolytic capacitors. Preferred are lithium ion secondary batteries and electric double-layer capacitors.

In the following, a lithium ion secondary battery is described as an example of the electrochemical device or secondary battery of the invention.

The lithium ion secondary battery includes a positive electrode, a negative electrode, and the aforementioned electrolyte solution.

<Positive Electrode>

The positive electrode includes a positive electrode active material layer containing a positive electrode active material which is a material of the positive electrode and a current collector.

The positive electrode active material may be any material that can electrochemically occlude and release lithium ions. For example, a substance containing lithium and at least one transition metal is preferred. Specific examples thereof include lithium-containing transition metal complex oxides and lithium-containing transition metal phosphoric acid compounds. In particular, the positive electrode active material is preferably a lithium-containing transition metal complex oxide that generates a high voltage.

Examples of the lithium-containing transition metal complex oxide include lithium-manganese spinel complex oxides represented by the formula (L): $Li_aMn_{2-b}M^1{}_bO_4$ (wherein $0.9 \leq a$; $0 \leq b \leq 1.5$; and $M^1$ is at least one metal selected from the group consisting of Fe, Co, Ni, Cu, Zn, Al, Sn, Cr, V, Ti, Mg, Ca, Sr, B, Ga, In, Si, and Ge), lithium-nickel complex oxides represented by the formula (M): $LiNi_{1-c}M^2{}_cO_2$ (wherein $0 \leq c \leq 0.5$; and $M^2$ is at least one metal selected from the group consisting of Fe, Co, Mn, Cu, Zn, Al, Sn, Cr, V, Ti, Mg, Ca, Sr, B, Ga, In, Si, and Ge), and lithium-cobalt complex oxides represented by the formula (N): $LiCo_{1-d}M^3{}_dO_2$ (wherein $0 \leq d \leq 0.5$; and $M^3$ is at least one metal selected from the group consisting of Fe, Ni, Mn, Cu, Zn, Al, Sn, Cr, V, Ti, Ma, Ca, Sr, B, Ga, In, Si, and Ge).

In order to provide a high-power lithium ion secondary battery having a high energy density, preferred is $LiCoO_2$, $LiMnO_2$, $LiNiO_2$, $LiMn_2O_4$, $LiNi_{0.8}Co_{0.15}Al_{0.05}O_2$, $LiNi_{0.5}Mn_{1.5}O_4$, or $LiNi_{1/3}Co_{1/3}Mn_{1/3}O_2$.

Other examples of the positive electrode active material include $LiFePO_4$, $LiNi_{0.8}Co_{0.2}O_2$, $Li_{1.2}Fe_{0.4}Mn_{0.4}O_2$, $LiNi_{0.5}Mn_{0.5}O_2$, and $LiV_3O_6$.

In order to improve the continuous charge performance, the positive electrode active material preferably contains lithium phosphate. Lithium phosphate may be used in any manner, and is preferably used in admixture with the positive electrode active material. The lower limit of the amount of the lithium phosphate is preferably 0.1 mass % or more, more preferably 0.3 mass % or more, still more preferably 0.5 mass % or more, relative to the sum of the amounts of the positive electrode active material and the lithium phosphate. The upper limit thereof is preferably 10 mass % or less, more preferably 8 mass % or less, still more preferably 5 mass % or less.

To the surface of the positive electrode active material may be attached a substance having a composition different from the positive electrode active material. Examples of the substance attached to the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; and carbon.

Such a substance may be attached to the surface of the positive electrode active material by, for example, a method of dissolving or suspending the substance in a solvent, impregnating the solution or suspension into the positive electrode active material, and drying the impregnated material; a method of dissolving or suspending a precursor of the substance in a solvent, impregnating the solution or suspension into the positive electrode active material, and reacting the material and the precursor by heating; or a method of adding the substance to a precursor of the positive electrode active material and simultaneously sintering the materials. In the case of attaching carbon, for example, a carbonaceous material in the form of activated carbon may be mechanically attached to the surface afterward.

The lower limit of the amount (in terms of mass) of the substance attached to the surface is preferably 0.1 ppm or more, more preferably 1 ppm or more, still more preferably 10 ppm or more, relative to the amount of the positive electrode active material. The upper limit thereof is preferably 20% or less, more preferably 10% or less, still more preferably 5% or less. The substance attached to the surface can reduce oxidation of the electrolyte solution on the surface of the positive electrode active material, improving the battery life. Too small an amount of the substance may fail to sufficiently provide the effect. Too large an amount thereof may hinder the entrance and exit of lithium ions, increasing the resistance.

Particles of the positive electrode active material may have any shape conventionally used, such as an agglomerative shape, a polyhedral shape, a spherical shape, an ellipsoidal shape, a plate shape, a needle shape, or a pillar shape. The primary particles may agglomerate to form secondary particles.

The positive electrode active material has a tap density of preferably 0.5 g/cm$^3$ or higher, more preferably 0.8 g/cm$^3$ or higher, still more preferably 1.0 g/cm$^3$ or higher. The positive electrode active material having a tap density below the lower limit may cause an increased amount of a dispersion medium required, as well as increased amounts of a conductive material and a binder required in formation of the positive electrode active material layer, limiting the filling rate of the positive electrode active material into the positive electrode active material layer and limiting the battery capacity complex oxide powder having a high tap density enables formation of a positive electrode active material layer with a high density. The tap density is preferably as high as possible and has no upper limit, in general. Still, too high a tap density may cause diffusion of lithium ions in the positive electrode active material layer with the electrolyte solution serving as a diffusion medium to function as a rate-determining step, easily impairing the load performance. Thus, the upper limit of the tap density is preferably 4.0 g/cm$^3$ or lower, more preferably 3.7 g/cm$^3$ or lower, still more preferably 3.5 q/cm$^3$ or lower.

The tap density is determined as a powder filling density (tap density) g/cc when 5 to 10 g of the positive electrode active material powder is filled into a 10-ml glass graduated cylinder and the cylinder is tapped 200, times with a stroke of about 20 mm.

The particles of the positive electrode active material have a median size d50 (or a secondary particle size if the primary particles agglomerate to form secondary particles) of preferably 0.3 μm or greater, more preferably 0.5 μm or greater, still mere preferably 0.8 μm or greater, most preferably 1.0

µm or greater, while preferably 30 µm or smaller, more preferably 27 µm or smaller, still more preferably 25 µm or smaller, most preferably 22 µm or smaller. The particles having a median size below the lower limit may fail to provide a product with a high tap density. The particles having a median size exceeding the upper limit may cause prolonged diffusion of lithium in the positive electrode active material layer, impairing the battery performance and generating streaks in formation of the positive electrode for a battery, i.e., when the active material and components such as a conductive material and a binder are formed into slurry by adding a solvent and the slurry is applied in the form of a film, for example. Mixing two or more positive electrode active materials having different median sizes d50 can further improve the easiness of filling in formation of the positive electrode.

The median size d50 is determined using a known laser diffraction/scattering particle size distribution analyzer. In the case of using LA-920 (Horiba, Ltd.) as the particle size distribution analyzer, the dispersion medium used in the measurement is a 0.1 mass % sodium hexametaphosphate aqueous solution and the measurement refractive index is set to 1.24 after 5-minute ultrasonic dispersion.

If the primary particles agglomerate to form secondary particles, the average primary particle size of the positive electrode active material is preferably 0.05 µm or greater, more preferably 0.1 µm or greater, still more preferably 0.2 µm or greater. The upper limit thereof is preferably 5 µm or smaller, more preferably 4 µm or smaller, still more preferably 3 µm or smaller, most preferably 2 µm or smaller. The primary particles having an average primary particle size exceeding the upper limit may have difficulty in forming spherical secondary particles, adversely affecting the powder filling. Further, such primary particles may have a greatly reduced specific surface area, highly possibly impairing the battery performance such as output performance. In contrast, the primary particles having an average primary particle size below the lower limit may usually be insufficiently grown crystals, causing poor charge and discharge reversibility, for example.

The primary particle size is measured by scanning electron microscopic (SEM) observation. Specifically, the primary particle size is determined as follows. A photograph at a magnification of 10000× is first taken. Any 50 primary particles are selected and the maximum length between the left and right boundary lines or each primary particle is measured along the horizontal line. Then, the average value of the maximum lengths is calculated, which is defined as the primary particle size.

The positive electrode active material has a BET specific surface area of preferably 0.1 $m^2/q$ or larger, more preferably 0.2 $m^2/g$ or larger, still more preferably 0.3 $m^2/g$ or larger, while preferably 50 $m^2/g$ or smaller, more preferably 40 $m^2/g$ or smaller, still more preferably 30 $m^2/g$ or smaller. The positive electrode active material having a BET specific surface area smaller than the above range is likely to impair the battery performance. The positive electrode active material having a BET specific surface area larger than the above range is less likely to have an increased tap density, easily causing a difficulty in applying the material in formation of the positive electrode active material layer.

The BET specific surface area is defined by a value determined by single point BET nitrogen adsorption utilizing a gas flow method using a surface area analyzer (e.g., fully automatic surface area measurement device, Ohkura Riker: Co., Ltd.), a sample pre-dried in nitrogen stream at 150° C. for 30 minutes, and a nitrogen-helium gas mixture with the nitrogen pressure relative to the atmospheric pressure being accurately adjusted to 0.3.

When the lithium ion secondary battery is used as a large-size lithium ion secondary battery for hybrid vehicles or distributed generation, it is required to achieve a high output. Thus, the particles of the positive electrode active material preferably mainly include secondary particles.

The particles of the positive electrode active material preferably include 0.5 to 7.0 vol % of fine particles having an average secondary particle size of 40 µm or smaller and having an average primary particle size of 1 µm or smaller. The presence of fine particles having an average primary particle size of 1 µm or smaller enlarges the contact area with the electrolyte solution and enables more rapid diffusion of lithium ions between the electrode and the electrolyte solution, improving the output performance of the battery.

The positive electrode active material can be produced by any usual method of producing inorganic compounds. In particular, a spherical or ellipsoidal active material can be produced by various methods. For example, a material substance of transition metal is dissolved or crushed and dispersed in a solvent such as water, and the pH of the solution or dispersion is adjusted under stirring to form a spherical precursor. The precursor is recovered and, if necessary, dried. Then, a Li source such as LiOH, $Li_2CO_3$, or $LiNO_3$ is added thereto and the mixture is sintered at high temperature, thereby providing an active material.

In order to produce a positive electrode, the aforementioned positive electrode active materials may be used alone, or one or more thereof having different compositions may be used in combination at any ratio. Preferred examples of the combination in this case include a combination of $LiCoO_2$ and $LiMn_2O_4$ in which part of Mn may optionally be replaced by a different transition metal (e.g., $LiNi_{0.33}Co_{0.33}Mn_{0.33}O_2$), and a combination with $LiCoO_2$ in which part of Co may optionally be replaced by a different transition metal.

In order to achieve a high battery capacity, the amount of the positive electrode active material is preferably 50 to 99 mass %, more preferably 80 to 99 mass %, of the positive electrode mixture. The amount of the positive electrode active material in the positive electrode active material layer is preferably 80 mass % or more, more preferably 82 mass % or more, particularly preferably 84 mass % or more. The amount thereof is also preferably 99 mass % or less, more preferably 98 mass % or less. Too small an amount of the positive electrode active material in the positive electrode active material layer may cause an insufficient electric capacity. In contrast, too large an amount thereof may cause insufficient strength of the resulting positive electrode.

The positive electrode mixture preferably further includes a binder, a thickening agent, and a conductive material.

The binder may be any material that is safe against a solvent to be used in production of electrodes and the electrolyte solution. Examples thereof include polyvinylidene fluoride, polytetrafluoroethylene, polyethylene, polypropylene, SEP (styrene-butadiene rubber), isoprene rubber, butadiene rubber, ethylene-acrylic acid copolymers, ethylene-methacrylic acid copolymers, polyethylene terephthalate, polymethyl methacrylate, polyimide, aromatic polyamide, cellulose, nitro cellulose, NBR (acrylonitrile-butadiene rubber), fluororubber, ethylene-propylene rubber, styrene-butadiene-styrene block copolymers and hydrogenated products thereof, EPDM (ethylene-propylene-diene terpolymers), styrene-ethylene-butadiene-ethylene copolymers, styrene-isoprene-styrene block copolymers and hydrogenated products thereof, syndiotactic-1,2-polybutadiene, polyvinyl acetate, ethylene-vinyl acetate copolymers, propylene-α-olefin copolymers, fluorinated polyvinylidene fluoride, polytetrafluoroethylene-ethylene copolymers, and polymer compositions having an ion conductivity of alkali metal ions (especially, lithium ions). These agents may be used alone or in any combination of two or more at any ratio.

The amount of the binder, which is expressed as the proportion of the binder in the positive electrode active material layer., is usually 0.1 mass % or more, preferably 1 mass % or more, more preferably 1.5 mass % or more. The proportion is also usually 80 mass % or less, preferably 60 mass % or less, still more preferably 40 mass % or less, most preferably 10 mass % or less. Too low a proportion of the binder may fail to sufficiently hold the positive electrode active material and cause insufficient mechanical strength of the positive electrode, impairing the battery performance such as cycle performance. In contrast, too high a proportion thereof may cause reduction in battery capacity and conductivity.

Examples of the thickening agent include carboxymethyl cellulose, methyl cellulose, hydroxymethyl cellulose, ethyl cellulose, polyvinyl alcohol, oxidized starch, monostarch phosphate, casein, and salts thereof. These agents may be used alone or in any combination of two or more at any ratio.

The proportion of the thickening agent is usually 0.1 mass % or more, preferably 0.2 mass % or more, more preferably 0.3 mass % or more, while usually 5 mass % or less, preferably 3 mass % or less, more preferably 2 mass % or less, relative to the active material. The thickening agent at a proportion below this range may cause significantly poor application. The thickening agent at a proportion above this range may cause a low proportion of the active material in the positive electrode active material layer, resulting in a low capacity of the battery and high resistance between the positive electrode active materials.

The conductive material may he any known conductive material. Specific examples thereof include metal materials such as copper and nickel, and carbon materials such as graphite (e.g., natural graphite, artificial graphite), carbon black (e.g., acetylene black), and amorphous carbon (e.g., needle coke). These materials may be used alone or in any combination of two or more at any ratio. The conductive material is used in an amount of usually 0.01 mass % or more, preferably 0.1 mass % or more, more preferably 1 mass % or more, while usually 50 mass % or less, preferably 30 mass % or less, more preferably 15 mass % or less, in the positive electrode active material layer. The conductive material in an. amount below this range may cause insufficient conductivity. In contrast, the conductive material in an amount above this range may cause a low battery capacity.

The solvent for forming slurry may be any solvent that can dissolve or disperse therein the positive electrode active material, the conductive material, and the binder, as well as a thickening agent used if necessary. The solvent may be either of an aqueous solvent or an organic solvent. Examples of the aqueous medium include water and solvent mixtures of an alcohol and water. Examples of the organic medium include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethyl form amide, and dimethyl acetamide; and aprotic polar solvents such as hexamethyl phospharamide and dimethyl sulfoxide.

Examples of the material of the current collector for positive electrodes include metal materials such as aluminum, titanium, tantalum, stainless steel, and nickel, and alloys thereof; and carbon materials such as carbon cloth and carbon paper. Preferred is any metal material, especially aluminum or an alloy thereof.

In the case of a metal material, the current collector may be in the form of metal foil, metal cylinder, metal coil, metal plate, metal film, expanded metal, punched metal, metal foam, or the like. In the case of a carbon material, it may be in the form of carbon plate, carbon film, carbon cylinder, or the like. Preferred among these is a metal film. The film may be in the form of mesh, as appropriate. The film may have any thickness, and the thickness is usually 1 µm or greater, preferably 3 µm or greater, more preferably 5 µm or greater, while usually 1 mm or smaller, preferably 100 µm or smaller, more preferably 50 µm or smaller. The film having a thickness smaller than this range may have insufficient strength as a current collector. In contrast, the film having a thickness greater than this range may have poor handleability.

In order to reduce the electronic contact resistance between the current collector and the positive electrode active material layer, the current collector also preferably has a conductive auxiliary agent applied on the surface thereof. Examples of the conductive auxiliary agent include carbon and noble metals such as gold, platinum, and silver.

The ratio between the thicknesses of the current collector and the positive electrode active material layer may be any value, and the ratio {(thickness of positive electrode active material layer on one side immediately before injection of electrolyte solution)/(thickness of current collector)} is preferably 20 or lower, more preferably 15 or lower, most preferably 10 or lower. The ratio is also preferably 0.5 or higher, more preferably 0.8 or higher, most preferably 1 or higher. The current collector and the positive electrode active material layer showing a ratio exceeding this range may cause the current collector to generate heat due to Joule heating during high-current-density charge and discharge. The current collector and the positive electrode active material layer showing a ratio below this range may cause an increased ratio by volume of the current collector to the positive electrode active material, reducing the battery capacity.

The positive electrode may be produced by a usual method. One example of the production method is a method in which the positive electrode active material is mixed with the aforementioned binder, thickening agent, conductive material, solvent, and other components to form a slurry-like positive electrode mixture, and then this mixture is applied to a current collector, dried, and pressed so as to be densified.

The densification may be achieved using a manual press or a roll press, for example. The density of the positive electrode active material layer is preferably 1.5 q/cm$^3$ or higher, more preferably 2 g/cm$^3$ or higher, still more preferably 2,2 g/cm$^3$ or higher, while preferably 5 g/cm$^3$ or lower, more preferably 4.5 g/cm or lower, still more preferably 4 g/cm$^3$ or lower. The positive electrode active material layer having a density above this range may cause low permeability of the electrolyte solution toward the vicinity of the interface between the current collector and the active material, and poor charge and discharge performance particularly at a high current density, failing to provide a high output. The positive electrode active material layer having a density below this range may cause poor conductivity between the active materials and increase the battery resistance, failing to provide a high output.

In the case of using the electrolyte solution of the invention, in order to improve the stability at high output and high temperature, the area of the positive electrode active material layer is preferably large relative to the outer surface area of an external case of the battery. Specifically, the total area of the positive electrode is preferably 15 times or more, more preferably 40 times or more, greater than the surface area of the external case of the secondary battery. For closed, square-shaped cases, the outer surface area of an external case of the battery herein refers to the total area calculated from the dimensions of length, width, and thickness of the case portion into which a power-generating element is filled except for a protruding portion of a terminal. For closed, cylinder-like cases, the outer surface area of an external case of the battery herein refers to a geometric surface area of an approximated cylinder of the case portion into which a power-generating element is filled except for a protruding portion of a terminal. The total area of the positive electrode herein refers to the geometric surface area of the positive electrode mixture layer opposite to a mixture layer including the negative electrode active material. For structures including a current collector foil and positive electrode mixture layers on both sides of the current collector, the total area of the positive electrode is the sum of the areas calculated on the respective sides.

The positive electrode plate may have any thickness. In order to achieve a high capacity and a high output, the lower limit of the thickness of the mixture layer on one side of the current collector excluding the thickness of the base metal foil is preferably 10 µm or greater, more preferably 20 µm or greater, while preferably 500 µm or smaller, more preferably 450 µm or smaller.

To the surface of the positive electrode plate may be attached a substance having a different composition. Examples of the substance attached to the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; and carbon.

<Negative Electrode>

The negative electrode includes a negative electrode active material layer containing a negative electrode active material and a current collector.

Examples of the negative electrode active material include carbonaceous materials that can occlude and release lithium such as pyrolysates of organic matter under various pyrolysis conditions, artificial graphite, and natural graphite; metal oxide materials that can occlude and release lithium such as tin oxide and silicon oxide; lithium metals; various lithium alloys; and lithium-containing metal complex oxide materials. Two or more of these negative electrode active materials may be used in admixture with each other.

The carbonaceous material that can occlude and release lithium is preferably artificial graphite produced by high-temperature treatment of easily graphitizable pitch from various materials, purified natural graphite, or a material obtained by surface-treating such graphite with pitch or other organic matter and then carbonizing the surface-treated graphite. In order to achieve a good balance between the initial irreversible capacity and the high-current-density charge and discharge performance, the carbonaceous material is more preferably selected from carbonaceous materials obtained by one or more heat treatments at 400° C. to 3200° C. on natural graphite, artificial graphite, artificial carbonaceous substances, or artificial graphite substances; carbonaceous materials which allow the negative electrode active material layer to include at least two or more carbonaceous matters having different crystallinities and/or have an interface between the carbonaceous matters having the different crystallinities; and carbonaceous materials which allow the negative electrode active material layer to have an interface between at least two or more carbonaceous matters having different orientations. These carbonaceous materials may be used alone or in any combination of two or more at any ratio.

Examples of the carbonaceous materials obtained by one or more heat treatments at 400° C. to 3200° C. on artificial carbonaceous substances or artificial graphite substances include natural graphite, coal-based coke, petroleum-based coke, coal-based pitch, petroleum-based pitch, and those prepared by oxidizing these pitches; needle coke, pitch coke, and carbon materials prepared by partially graphitizing these cokes; pyrolysates of organic matter such as furnace black, acetylene black, and pitch-based carbon fibers; carbonizable organic matter and carbides thereof; and solutions prepared by dissolving carbonizable organic matter in a low-molecular-weight organic solvent such as benzene, toluene, xylene, quinoline, or n-hexane, and carbides thereof.

The metal material (excluding lithium-titanium complex oxides) to be used as the negative electrode active material may be any compound that can occlude and release lithium, and examples thereof include simple lithium, simple metals and alloys that constitute lithium alloys, and oxides, carbides, nitrides, silicides, sulfides, and phosphides thereof. The simple metals and alloys constituting lithium alloys are preferably materials containing any of metal and semi-metal elements in Groups 13 and 14, more preferably simple metal of aluminum, silicon, and tin (hereinafter, referred to as "specific metal elements"), and alloys and compounds containing any of these atoms. These materials may be used alone or in combination of two or more at any ratio.

Examples of the negative electrode active material having at least one atom selected from the specific metal elements include simple metal of any one specific metal element, alloys of two or more specific metal elements, alloys of one or two or more specific metal elements and one or two or more other metal elements, compounds containing one or two or more specific metal elements, and composite compounds such as oxides, carbides, nitrides, silicides, sulfides, and phosphides of the compounds. The use of such a simple metal, alloy, or metal compound as the negative electrode active material can provide a high-capacity battery.

Examples thereof further include compounds in which any of the above composite compounds are complexly bonded with several elements such as simple metals, alloys, and nonmetal elements. Specifically, in the case of silicon or tin, for example, an alloy of this element and a metal that does not serve as a negative electrode can he used. In the case of tin, for example, a composite compound including a combination of 5 or 6 elements, including tin, a metal (excluding silicon) that serves as a negative electrode, a metal that does not serve as a negative electrode, and a nonmetal element, can be used.

Specific examples thereof include simple Si, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_6Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v \leq 2$), LiSiO, simple tin, $SnSiO_3$, LiSnO, $Mg_2Sn$, and $SnO_w$ ($0 \leq w \leq 2$).

Examples thereof further include composite materials of Si or Sn used as a first constitutional element, and second and third constitutional elements. The second constitutional element is at least one selected from cobalt, iron, magnesium, titanium, vanadium, chromium, manganese, nickel, copper, zinc, gallium, and zirconium, for example. The third constitutional element is at least one selected from boron, carbon, aluminum, and phosphorus, for example.

In order to achieve a high battery capacity and excellent battery performance, the metal material is preferably simple silicon or tin (which may contain trace impurities), SiOv (0<v≤2), SnOw (0≤w≤2), a Si—Co—C composite material, a Si—Ni—C composite material, a Sn—Co—C composite material, or a Sn—Ni—C composite material.

The lithium-containing metal complex oxide material to be used as the negative electrode active material may he any material that can occlude and release lithium. In order to achieve good high-current-density charge and discharge performance, materials containing titanium and lithium are preferred, lithium-containing metal complex oxide materials containing titanium are more preferred, and complex oxides of lithium and titanium (hereinafter, abbreviated as "lithium titanium complex oxides") are still more preferred. In other words, use of a spinel-structured lithium titanium complex oxide contained in the negative electrode active material for electrolyte batteries is particularly preferred because such a compound can markedly reduce the output resistance.

Preferred examples of the lithium titanium complex oxides include compounds represented by the following formula (O):

$$Li_xTi_yM_zO_4 \quad (O)$$

wherein M is at least one element selected from the group consisting of Na, K, Co, Al, Fe, Ti, Mg, Cr, Ga, Cu, Zn, and Nb.

In order to achieve a good balance of the battery performance, particularly preferred compositions represented by the formula (O) are those satisfying one of the following:

$$1.2 \leq x \leq 1.4,\ 1.5 \leq y \leq 1.7,\ z=0 \quad (i)$$

$$0.9 \leq x \leq 1.1,\ 1.9 \leq y \leq 2.1,\ z=0 \quad (ii)$$

$$0.7 \leq x \leq 0.9,\ 2.1 \leq y \leq 2.3,\ z=0 \quad (iii)$$

Particularly preferred representative composition of the compound is $Li_{4/3}Ti_{5/3}O_4$ corresponding to the composition (i), $Li_1Ti_2O_4$ corresponding to the composition (ii), and $Li_{4/5}Ti_{11/5}O_4$ corresponding to the composition (iii). Preferred examples of the structure satisfying a Z≠0 include $Li_{4/3}Ti_{4/3}Al_{1/3}O_4$.

The negative electrode mixture preferably further contains a binder, a thickening agent, and a conductive material.

Examples of the binder include the same binders as those mentioned for the positive electrode. The proportion of the binder is preferably 0.1 mass % or more, more preferably 0.5 mass % or more, particularly preferably 0.6 mass % or more, while preferably 20 mass % or less, more preferably 15 mass % or less, still more preferably 10 ma ;s or dess, particularly preferably 8 mass % or less, relative to the negative electrode active material. The binder at a proportion relative to the negative electrode active material exceeding the above range may contain an increased proportion of the binder which fails to contribute to the battery capacity, causing a low battery capacity. The binder at a proportion lower than the above range may cause lowered strength of the negative electrode.

In particular, in the case of using a rubbery polymer typified by SBR as a main component, the proportion of the binder is usually 0.1 mass % or more, preferably 0.5 mass % or more, more preferably 0.6 mass % or more, while usually 5 mass % or less, preferably 3 mass % or less, more preferably 2 mass % or less, relative to the negative electrode active material. In the case of using a fluoropolymer typified by polyvinylidene fluoride as a main component, the proportion of the binder is usually 1 mass % or more, preferably 2 mass % or more, more preferably 3 mass % or more, while usually 15 mass % or less, preferably 10 mass % or less, more preferably 8 mass % or less, relative to the negative electrode active material.

Examples of the thickening agent include the same thickening agents as those mentioned for the positive electrode. The proportion of the thickening agent usually 0.1 mass % or more, preferably 0.5 mass % or more, still more preferably 0.6 mass % or more, while usually 5 mass % or less, preferably 3 mass % or less, still more preferably 2 mass % or less, relative to the negative electrode active material. The thickening agent at a proportion relative to the negative electrode active material below the range may cause significantly impaired easiness of application. The thickening agent at a proportion above the range may cause a small proportion of the negative electrode active material in the negative electrode active material layer, resulting in a low capacity of the battery and high resistance between the negative electrode active materials.

Examples of the conductive material of the negative electrode include metal materials such as copper and nickel; and carbon materials such as graphite and carbon black.

The solvent for forming slurry may be any solvent that can dissolve or disperse the negative electrode active material and the binder, and a thickening agent and a conductive material that are used as necessary. The slurry-forming solvent may be an aqueous solvent or an organic solvent.

Examples of the aqueous solvent include water and alcohols. Examples of the organic solvent include N-methylpyrrolidone (NMP), dimethyl formamide, dimethyl acetamide, methyl ethyl ketone, cyclohexanone, methyl acetate, methyl acrylate, diethyl triamine, N,N-dimethyl aminopropyl amine, tetrahydrofuran (THE), toluene, acetone, diethyl ether, dimethyl acetamide, hexamethyl phospharamide, dimethyl sulfoxide, benzene, xylene, quinoline, pyridine, methyl naphthalene, and hexane.

Examples of the material of the current collector for negative electrodes include copper, nickel, and stainless steel. In order to easily process the material into a film and to minimize the cost, copper is preferred.

The current collector usually has a thickness of 1 μm or greater, preferably 5 μm or greater, while usually 100 μm or smaller, preferably 50 μm or smaller. Too thick a negative electrode current collector may cause an excessive reduction in capacity of the whole battery, whereas too thin a current collector may be difficult to handle.

The negative electrode may be produced by a usual method. An example of the production method is a method in which the negative electrode material is mixed with the aforementioned binder, thickening agent, conductive material, solvent, and other components to form a slurry-like mixture, and then this mixture is applied to a current collector, dried, and pressed so as to be densified. In the case of using an alloyed material, a thin film layer containing the above negative electrode active material (negative electrode active material layer) can be produced by vapor deposition, sputtering, plating, or the like.

The electrode formed from the negative electrode active material may have any structure. The negative electrode active material existing on the current collector preferably has a density of 1 g·cm$^{-3}$ or higher, more preferably 1.2 g·cm$^{-3}$ or higher. Particularly preferably 1.3 g·cm$^{-3}$ or higher, while preferably 2.2 g·cm$^{-3}$ or lower, more preferably 2.1 g·cm$^{-3}$ or lower, still more preferably 2.0 g·cm$^{-3}$ or lower, particularly preferably 1.9 g·cm$^{-3}$ or lower. The negative electrode active material existing on the current collector having a density exceeding the above range may cause destruction of the negative electrode active material particles, resulting in a high initial irreversible capacity and poor high-current-density charge and discharge performance due to reduction in permeability of the electrolyte solution toward the vicinity of the interface between the current collector and the negative electrode active material. The negative electrode active material having a density below the above range may cause poor conductivity between the negative electrode active materials, a high battery resistance, and a low capacity per unit volume.

The thickness of the negative electrode plate is a design matter in accordance with the positive electrode plate to be used, and may be any value. The thickness of the mixture layer excluding the thickness of the base metal foil is usually 15 μm or greater, preferably 20 μm or greater, more preferably 30 μm or greater, while usually 300 μm or smaller, preferably 280 μm or smaller, more preferably 250 μm or smaller.

To the surface of the negative electrode plate may be attached a substance having a composition different from the negative electrode plate. Examples of the substance attached to the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; and carbonates such as lithium carbonate, calcium carbonate, and magnesium carbonate.

<Separator>

The lithium ion secondary battery preferably further includes a separator.

The separator may be formed from any known material and may have any known shape as long as the resulting separator is stable to the electrolyte solution and is excellent in a liquid-retaining ability. The separator is preferably in the form of a porous sheet or a nonwoven fabric which is formed from a material stable to the electrolyte solution of the invention, such as resin, glass fiber, or inorganic matter, and which has an excellent liquid-retaining ability.

Examples of the material of a resin or glass-fiber separator include polyolefins such as polyethylene and polypropylene, aromatic polyimide, polytetrafluoroethylene, polyether sulfone, and glass filters. These materials may he used alone or in any combination of two or more at any ratio, for example, in the form of a polypropylene/polyethylene bilayer film or a polypropylene/polyethylene/polypropylene trilayer film. In order to achieve good permeability of the electrolyte solution and a good shut-down effect, the separator is particularly preferably a porous sheet or a nonwoven fabric formed from a polyolefin such as polyethylene or polypropylene.

The separator may have any thickness, and the thickness is usually 1 μm or greater, preferably 5 μm or greater, more preferably 8 μm or greater, while usually 50 μm or smaller, preferably 40 μm or smaller, more preferably 30 μm or smaller. The separator thinner than the above range may have poor insulation and mechanical strength. The separator thicker than the above range may not only have poor battery performance such as poor rate performance but also cause a low energy density of the whole electrolyte battery.

The separator which is a porous one such as a porous sheet or a nonwoven fabric nay have any porosity. The porosity is usually 20% or higher, preferably 35% or higher, more preferably 45% or higher, while usually 90% or lower, preferably 85% or lower, more preferably 75% or lower. The separator having a porosity lower than the range tends to have high film resistance and cause poor rate performance. The separator having a porosity higher than the range tends to have low mechanical strength and poor insulation.

The separator may also have any average pore size. The average pore size is usually 0.5 μm or smaller, preferably 0.2 μm or smaller, while usually 0.05 μm or larger. The separator having an average pore size exceeding the range may easily cause short circuits. The separator having an average pore size lower than the range may have high film resistance and poor rate performance.

Examples of the inorganic material include oxides such as alumina and silicon dioxide, nitrides such as aluminum nitride and silicon nitride, and sulfates such as barium sulfate and calcium sulfate. The inorganic material is in the form of particles or fibers.

The separator is in the form of a thin film such as a nonwoven fabric, a woven fabric, or a microporous film. The thin film favorably has a pore size of 0.01 to 1 μm and a thickness of 5 to 50 μm. Instead of the above separate thin film, the separator may have a structure in which a composite porous layer containing particles of the above inorganic material is formed on the surface of one or both of the positive and negative electrodes using a resin binder. For example, alumina particles having a 90% particle size of smaller than 1 μm are applied to the respective surfaces of the positive electrode with fluororesin used as a binder to form a porous layer.

<Battery Design>

The electrode group may be either a laminated structure including the above positive and negative electrode plates with the above separator in between, or a wound structure including the above positive and negative electrode plates in spiral with the above separator in between. The proportion of the volume of the electrode group in the battery internal volume (hereinafter, referred to as an electrode group proportion) is usually 40% or higher, preferably 50% or higher, while usually 90% or lower, preferably 80% or lower.

The electrode group proportion lower than the above range may cause a low battery capacity. The electrode group proportion exceeding the above range may cause the battery to have small space for voids. Thus, if the battery temperature rises to high temperature, the components may swell and the liquid fraction of the electrolyte solution exhibits a high vapor pressure, so that the internal pressure rises. This may impair the battery performance such as charge and discharge repeatability and high-temperature storage ability and actuate a gas-releasing valve for releasing the internal pressure toward the outside.

The current collecting structure may be any structure. In order to more effectively improve the high-current-density charge and discharge performance by the electrolyte solution of the invention, the current collecting structure is preferably a structure which reduces the resistances at wiring portions and jointing portions. Such reduction in the internal resistance can particularly favorably lead to the effects of using the electrolyte solution of the invention.

In an electrode group having the layered structure, the metal core portions of the respective electrode layers are preferably bundled and welded to a terminal. If an electrode has a large area, the internal resistance is high. Thus, multiple terminals may preferably be formed in the electrode to reduce the resistance. In an electrode group having the wound structure, multiple lead structures may be disposed on each of the positive electrode and the negative electrode and bundled to a terminal. Thereby, the internal resistance can be reduced.

The external case may be made of any material that is stable to an electrolyte solution to be used. Specific examples thereof include metals such as nickel-plated steel plates, stainless steel, aluminum and aluminum alloys, and magnesium alloys, and a layered film (laminate film) of resin and aluminum foil. In order to reduce the weight, a metal such as aluminum or an aluminum alloy or a laminate film is favorably used.

External cases made of metal may have a sealed up structure formed by welding the metal by laser welding, resistance welding, or ultrasonic welding or a caulking structure using the metal via a resin gasket. External cases made of a laminate film may have a sealed up structure formed by hot melting the resin layers. In order to improve the scalability, a resin which is different from the resin of the laminate film may be disposed between the resin layers. Especially, in the case of forming a sealed up structure by hot melting the resin layers via current collecting terminals, metal and resin are to be bonded. Thus, the resin to be disposed between the resin layers as favorably a resin having a polar group or a modified resin having a polar group introduced thereinto.

The lithium ion secondary battery may have any shape, and examples thereof include cylindrical batteries, square batteries, laminated batteries, coin batteries, and large-size batteries. The shapes and the configurations of the positive electrode, the negative electrode, and the separator may be changed in accordance with the shape of the battery.

A module including the electrochemical device or secondary battery that includes the electrolyte solution of the invention is also one aspect of the invention.

Also preferably, the secondary battery includes the above electrolyte solution, wherein a positive electrode current collector and a portion in contact with the electrolyte solution among portions electrically coupled with the positive electrode current collector are formed from a valve metal or an alloy thereof. The secondary battery is preferably a lithium ion secondary battery.

Examples of the valve metal include aluminum, titanium, tantalum, and chromium. The positive electrode current collector is more preferably formed from aluminum or an alloy of aluminum.

For the secondary battery, a portion in contact with the electrolyte solution among portions electrically coupled with the positive electrode current collector is also preferably formed from a valve metal or an alloy thereof. In particular, a portion electrically coupled with the positive electrode current collector and in contact with the electrolyte solution of the external case of the battery and components such as leads and a safety valve accommodated in the external case of the battery is preferably formed from a valve metal or an alloy thereof. Stainless steel coated with a valve metal or an alloy thereof may also be used.

An example of the electrochemical device using the electrolyte solution of the invention is an electric double-layer capacitor.

In the electric double-layer capacitor, at least one of the positive electrode and the negative electrode is a polarizable electrode. Examples of the polarizable electrode and a non-polarizable electrode include the following electrodes specifically disclosed in JP H09-7896 A.

The polarizable electrode mainly containing activated carbon preferably contains inactivated carbon having a large specific surface area and a conductive material, such as carbon black, providing electronic conductivity. The polarizable electrode can be formed by any of various methods. For example, a polarizable electrode including activated carbon and carbon black can be produced by mixing activated carbon powder, carbon black, and phenolic resin, press-molding the mixture, and then sintering and activating the mixture in an inert gas atmosphere and water vapor atmosphere. Preferably, this polarizable electrode is bonded to a current collector using a conductive adhesive, for example.

Alternatively, a polarizable electrode can also be formed by kneading activated carbon powder, carbon black, and a binder in the presence of alcohol and forming the mixture into a sheet shape, and then drying the sheet. This binder may be polytetrafluoroethylene, for example. Alternatively, a polarizable electrode integrated with a current collector can be produced by mixing activated carbon powder, carbon black, a binder, and a solvent to form slurry, applying this slurry to metal foil of a current collector, and then drying the slurry. polarizable electrodes mainly containing activated carbon as the respective electrodes. Still, the electric double-layer capacitor may have a structure in which a non-polarizable electrode is used on one side. Examples of such a structure include a structure in which a positive electrode mainly containing an electrode active material such as a metal oxide is combined with a polarizable negative electrode mainly containing activated carbon; or a structure in which a negative electrode mainly containing a carbon material that can reversibly occlude and release lithium ions or a negative electrode of lithium metal or lithium alloy is combined with a polarizable electrode mainly containing activated carbon.

In place of or in combination with activated carbon, any carbonaceous material such as carbon black, graphite, expanded graphite, porous carbon, carbon nanotube, carbon nanohorn, and Kethenblack may be used.

The non-polarizable electrode is preferably an electrode mainly containing a carbon material that can reversibly occlude and release lithium ions, with this carbon material made to occlude lithium ions in advance. In this case, the electrolyte used is a lithium salt. The electric double-layer capacitor having such a structure can achieve a much higher withstand voltage exceeding 4 V.

The solvent used in preparation of the slurry in the production of electrodes is preferably one that dissolves a binder. In accordance with the type of a binder, the solvent is appropriately selected from N-methylpyrrolidone, dimethyl formamide, toluene, xylene, isophorone, methyl ethyl ketone, ethyl acetate, methyl acetate, dimethyl phthalate, ethanol, methanol, butanol, and water.

Examples of the activated carbon used for the polarizable electrode include phenol resin-type activated carbon, coconut shell-type activated carbon, and petroleum coke-type activated carbon. In order to achieve a large capacity, petroleum coke-type activated carbon or phenol resin-type activated carbon is preferably used. Examples of methods of activating the activated carbon include steam activation and molten KOH activation. In order to achieve a larger capacity, activated carbon prepared by molten KOH activation is preferably used.

Preferred examples of the conductive agent used for the polarizable electrode include carbon black, Ketjenblack, acetylene black, natural graphite, artificial graphite, metal fiber, conductive titanium oxide, and ruthenium oxide. In order to achieve good conductivity (i.e., low internal resistance), and because too large an amount thereof may lead to a decreased capacity of the product, the amount of the conductive agent such as carbon black used for the polarizable electrode is preferably 1 to 50 mass % in the sum of the amounts of the activated carbon and the conductive agent.

In order to provide an electric double-layer capacitor having a large capacity and a low internal resistance, the activated carbon used for the polarizable electrode preferably has an average particle size of 20 μm or smaller and a specific surface area of 1500 to 3000 m$^2$/g. Preferred examples of the carbon material for providing an electrode mainly containing a carbon material that can reversibly occlude and release lithium ions include natural graphite, artificial graphite, graphitized mesocarbon microsphere, graphitized whisker, vapor-grown carbon fiber, sintered furfuryl alcohol resin, and sintered novolak resin.

The current collector may be any chemically and electrochemically corrosion-resistant one. Preferred examples of the current collector used for the polarizable electrode mainly containing activated carbon include stainless steel, aluminum, titanium, and tantalum. Particularly preferred materials in terms of the characteristics and cost, of the resulting electric double-layer capacitor are stainless steel and aluminum. Preferred examples of the current collector used for the electrode mainly containing a carbon material that can reversibly occlude and release lithium ions include stainless steel, copper, and nickel.

Examples of methods of allowing the carbon material that can reversibly occlude and release lithium ions to occlude lithium ions in advance include: (1) a method of mixing powdery lithium to a carbon material that can reversibly occlude and release lithium ions; (2) a method of placing lithium foil on an electrode including a carbon material that can reversibly occlude and release lithium ions and a binder so as to bring the lithium foil to be in electrical contact with the electrode, immersing this electrode in an electrolyte solution containing a lithium salt dissolved therein so as to ionize the lithium, and allowing the carbon material to take in the resulting lithium ions; and (3) a method of placing an electrode including a carbon material that can reversibly occlude and release lithium ions and a binder on a minus side and placing a lithium metal on a plus side, immersing the electrodes in an electrolyte solution containing a lithium salt as an electrolyte, and supplying a current so that the carbon material is allowed to electrochemically take in the ionized lithium.

Examples of known electric double-layer capacitors include wound electric double-layer capacitors, laminated electric double-layer capacitors, and coin-type electric double-layer capacitors. The electric double-layer capacitor of the invention may also be any of these types.

For example, a wound electric double-layer capacitor is assembled by winding a positive electrode and a negative electrode each of which includes a laminate (electrode) of a current collector and an electrode layer, and a separator in between to provide a wound element, putting this wound element in a case made of aluminum, for example, filling the case with an electrolyte solution, preferably a non-aqueous electrolyte solution, and sealing the case with a rubber sealant.

A separator formed from a conventionally known material and having a conventionally known structure can be used even in the invention. Examples thereof include polyethylene porous membranes, and nonwoven fabric of polypropylene fiber, glass fiber, or cellulose fiber.

In accordance with any known method, the capacitor may be prepared in the form of a laminated electric double-layer capacitor in which sheet-like positive and negative electrodes are stacked with an electrolyte solution and a separator in between or a coin-type electric double-layer capacitor in which a positive electrode and a negative electrode are fixed by a gasket with an electrolyte solution and a separator in between.

As mentioned above, the electrolyte solution of the invention can favorably provide a secondary battery having a much smaller IV resistance value and much better high-temperature storage performance, and a module and electric double-layer capacitor including such a secondary battery.

EXAMPLES

The invention will be described with reference to, but not limited to, examples.

Examples and Comparative Examples (Preparation of Electrolyte Solution)

An acyclic carbonate and a cyclic carbonate were mixed in a ratio shown in Table 1 under dry argon atmosphere. To this solution were added additives 1 to 3 in amounts shown in Table 1, and dried PF$_6$ was further added so as to be a concentration of 1. mol/L. Thereby, a non-aqueous electrolyte solution was obtained. The amounts of the additives 1 to 3 blended were expressed by mass % relative to the solution (solvents).

The compounds in the tables are as follows

Acyclic Carbonates
  A: $CF_3CH_2OCOOCH_3$ (fluorine content: 36.1%)
  B: $CF_3CH_2OCOOCH_2CF_3$ (fluorine content: 50.4%)
  C: $HCF2CH_2OCOOCH_3$ (fluorine content: 27.1%)
  D: $H_2CFCH_2OCOOCH_3$ (fluorine content: 13.9%)

Cyclic Carbonates
  FEC: 4-fluoro-1,3-dioxolan-2-one
  CF3-EC: 4-trifluoromethyl-1,3-dioxolan-2-one Additives 1 (Lithium Salts (3))
  B: lithium difluoro(oxalato)borate (LiDFOB)
  F: lithium bis(oxalato)borate (LiBOB)
  G: lithium tetrafluoro(oxalato)phosphate Additives 2 (Lithium Salts (4))
  H: $LiPO_2F_2$
  I: $LiAsO_2F_2$
  J: $LiSbO_2F_2$ Additives 3 (Organosilicon Compounds)
  K: tris(trimethylsilyl) phosphate
  L: tris(trimethylsilyl) phosphite
  M: tris(trimethylsilyl) borate
  O: trimethylsilyl fluoride
  P: triethylsilyl fluoride (Production of Positive Electrode)

$LiNi_{0.5}Mn_{1.5}O_4$ used as a positive electrode active material, acetylene black used as a conductive material, and a dispersion of polyvinylidene fluoride (PVdF) in N-methyl-2-pyrrolidone used as a binder were mixed to prepare a positive electrode mixture slurry in which the solid content ratio of the active material, the conductive material, and the binder was 92/3/5 (mass % ratio). The positive electrode mixture slurry was uniformly applied to a 20-μm-thick current collector made of aluminum foil, followed by drying, and then the workpiece was compression-molded with a press. Thereby, a positive electrode was prepared.

(Production of Negative Electrode)

Powder of artificial graphite used as a negative electrode active material, an aqueous dispersion of sodium carboxymethyl cellulose (concentration of sodium carboxymethyl cellulose: 1 mass %) used as a thickening agent, and an aqueous dispersion of styrene-butadiene rubber (concentration of styrene-butadiene rubber: 50 mass %) used as a binder were mixed in an aqueous solvent to prepare a negative electrode mixture slurry in which the solid content ratio of the active material, the thickening agent, and the binder was 97.6/1.2/1.2 (mass % ratio). The slurry was uniformly applied to 20-μm-thick copper foil, followed by drying, and then the workpiece was compression-molded with a press. Thereby, a negative electrode was prepared.

(Production of Lithium Ion Secondary Battery)

The negative electrode prepared above, a polyethylene separator, and the positive electrode prepared above were stacked in the given order to provide a battery element.

A bag made of a laminate film was prepared in which an aluminum sheet (thickness: 40 μm) was coated with a resin layer on each side. The above battery element was placed in the bag in such a manner that the terminals of the positive electrode and negative electrode stuck out of the bag. One of the electrolyte solutions of the examples and the comparative examples was poured into the bag and the bag was vacuum sealed. Thereby, a sheet-like lithium ion secondary battery was produced.

(Charge and Discharge Treatment)

The battery produced was subjected to charge and discharge treatment. Specifically, the battery was subjected to constant current charge (CC charge) at a charge rate (constant current) of 0.5 C until the voltage between the positive and negative electrode terminals reached 4.9 V in an environment at 25° C., and then subjected to constant voltage charge (CV charge) until the current value reached 0.02 C. The battery continued to undergo CC discharge at a discharge rate of 0.5 C until the voltage between the positive and negative electrode terminals reached 3.0 V. The battery confirmed to achieve the discharge capacity equal to the theoretical capacity.

For the sheet-type lithium ion secondary batteries, the IV resistance value and the high-temperature storage performance were examined as follows.

<IV Resistance>

The battery was subjected to CC charge at 25° C. until the state of charge (SOC) reached 20%. Each battery adjusted to an SOC of 20% was subjected to CC discharge to 3 V at a discharge rate of 10 C, and the voltage drops during 10 seconds from the discharge were measured. The values (V) of the voltage drops measured were divided by the corresponding current value to calculate the IV resistances ($\Omega$), and the average thereof was defined as the IV resistance.

The IV resistances in Table 1 are each expressed as a relative ratio to the IV resistance, which is taken as 100, of the battery of Comparative Example 1.

Charge and Discharge Conditions

Charge: 0.5 C, 4.9 V, maintained until the charge current reached 0.02 C (CC/CV charge)

Discharge: 0.5 C, 3.0 V cut off (CC discharge)

(High-Temperature Storage Performance)

For the high-temperature storage performance, the battery was charged and discharged under the above charge and discharge conditions (charged at 0.5 C and a predetermined voltage until the charge current reached 0.02 C, and discharged at a current corresponding to 0.5 C until 3.0 V), and the discharge capacity was examined. Then, the battery was again charged under the above charge conditions and stored in an 85° C. temperature-constant chamber for a day. The battery after the storage was placed in a 25° C. environment, and then discharged under the above discharge conditions to a discharge cut-off voltage of 3 V and the residual capacity was measured. The battery was again charged under the above charge conditions and discharged under the above discharge conditions at a constant current to a discharge cut-off voltage of 3 V, and the capacity recovery was measured. The capacity recoveries in Table 1 are each expressed as a relative ratio to the capacity recovery of Comparative Example 1 which is taken as 100.

TABLE 1

| | Acyclic carbonate | | Cyclic carbonate | | Additive 1 | |
|---|---|---|---|---|---|---|
| | Structure | Proportion (vol %) | Structure | Proportion (vol %) | Structure | Proportion (mass %) |
| Example 1 | Component (A) | 70 | FEC | 30 | Component (E) | 0.5 |
| Example 2 | Component (A) | 70 | FEC | 30 | Component (E) | 0.001 |
| Example 3 | Component (A) | 70 | FEC | 30 | Component (E) | 0.01 |
| Example 4 | Component (A) | 70 | FEC | 30 | Component (E) | 0.1 |
| Example 5 | Component (A) | 70 | FEC | 30 | Component (E) | 1 |
| Example 6 | Component (A) | 70 | FEC | 30 | Component (E) | 0.5 |
| Example 7 | Component (A) | 70 | FEC | 30 | Component (E) | 0.5 |
| Example 8 | Component (A) | 70 | FEC | 30 | Component (E) | 0.5 |
| Example 9 | Component (A) | 70 | FEC | 30 | Component (E) | 0.5 |
| Example 10 | Component (A) | 70 | FEC | 30 | Component (E) | 0.5 |
| Example 11 | Component (A) | 70 | FEC | 30 | Component (E) | 0.5 |
| Example 12 | Component (A) | 70 | FEC | 30 | Component (E) | 0.5 |
| Example 13 | Component (A) | 70 | FEC | 30 | Component (E) | 0.5 |
| Example 14 | Component (A) | 70 | FEC | 30 | Component (E) | 0.5 |
| Example 15 | Component (A) | 70 | FEC | 30 | Component (F) | 0.5 |
| Example 16 | Component (A) | 70 | FEC | 30 | Component (G) | 0.5 |
| Example 17 | Component (A) | 70 | FEC | 30 | Component (E) | 0.5 |
| Example 18 | Component (A) | 70 | FEC | 30 | Component (E) | 0.5 |
| Example 19 | Component (A) | 70 | FEC | 30 | Component (E) | 0.5 |
| Example 20 | Component (A) | 70 | FEC | 30 | Component (E) | 0.5 |
| Example 21 | Component (A) | 70 | FEC | 30 | Component (E) | 0.5 |
| Example 22 | Component (A) | 70 | FEC | 30 | Component (E) | 0.5 |
| Example 23 | Component (B) | 70 | FEC | 30 | Component (E) | 0.5 |
| Example 24 | Component (A) | 70 | CF3-EC | 30 | Component (E) | 0.5 |
| Example 25 | Component (A) | 70 | CF3-EC | 30 | Component (E) | 0.5 |

TABLE 1-continued

| | | | | | | |
|---|---|---|---|---|---|---|
| Comparative Example 1 | Component (A) | 70 | FEC | 30 | | |
| Comparative Example 2 | Component (A) | 70 | FEC | 30 | Component (E) | 0.5 |
| Comparative Example 3 | Component (A) | 70 | FEC | 30 | | |
| Comparative Example 4 | Component (A) | 70 | FEC | 30 | Component (E) | 0.5 |
| Comparative Example 5 | Component (C) | 70 | FEC | 30 | Component (E) | 0.5 |
| Comparative Example 6 | Component (D) | 70 | FEC | 30 | Component (E) | 0.5 |

| | Additive 2 | | Additive 3 | | IV resistance (%) | Capacity recovery (%) |
|---|---|---|---|---|---|---|
| | Structure | Proportion (mass %) | Structure | Proportion (mass %) | | |
| Example 1 | Component (H) | 0.5 | Component (K) | 0.5 | 80 | 125 |
| Example 2 | Component (H) | 0.5 | Component (K) | 0.5 | 82 | 110 |
| Example 3 | Component (H) | 0.5 | Component (K) | 0.5 | 83 | 118 |
| Example 4 | Component (H) | 0.5 | Component (K) | 0.5 | 87 | 119 |
| Example 5 | Component (H) | 0.5 | Component (K) | 0.5 | 88 | 120 |
| Example 6 | Component (H) | 0.001 | Component (K) | 0.5 | 89 | 114 |
| Example 7 | Component (H) | 0.01 | Component (K) | 0.5 | 87 | 116 |
| Example 8 | Component (H) | 0.1 | Component (K) | 0.5 | 85 | 117 |
| Example 9 | Component (H) | 1 | Component (K) | 0.5 | 85 | 116 |
| Example 10 | Component (H) | 0.5 | Component (K) | 0.001 | 82 | 121 |
| Example 11 | Component (H) | 0.5 | Component (K) | 0.01 | 80 | 122 |
| Example 12 | Component (H) | 0.5 | Component (K) | 0.1 | 78 | 121 |
| Example 13 | Component (H) | 0.5 | Component (K) | 1 | 76 | 119 |
| Example 14 | Component (H) | 0.5 | Component (K) | 3 | 80 | 118 |
| Example 15 | Component (H) | 0.5 | Component (K) | 0.5 | 88 | 116 |
| Example 16 | Component (H) | 0.5 | Component (K) | 0.5 | 86 | 115 |
| Example 17 | Component (I) | 0.5 | Component (K) | 0.5 | 87 | 111 |
| Example 18 | Component (J) | 0.5 | Component (K) | 0.5 | 89 | 110 |
| Example 19 | Component (H) | 0.5 | Component (L) | 0.5 | 86 | 121 |
| Example 20 | Component (H) | 0.5 | Component (M) | 0.5 | 90 | 110 |
| Example 21 | Component (H) | 0.5 | Component (O) | 0.5 | 88 | 111 |
| Example 22 | Component (H) | 0.5 | Component (P) | 0.5 | 89 | 112 |
| Example 23 | Component (H) | 0.5 | Component (K) | 0.5 | 88 | 113 |
| Example 24 | Component (H) | 0.5 | Component (K) | 0.5 | 89 | 114 |
| Example 25 | Component (H) | 0.5 | Component (L) | 0.5 | 89 | 112 |
| Comparative Example 1 | | | | | 100 | 100 |
| Comparative Example 2 | Component (H) | 0.5 | | | 95 | 102 |
| Comparative Example 3 | Component (H) | 0.5 | Component (K) | 0.5 | 94 | 105 |
| Comparative Example 4 | | | Component (K) | 0.5 | 97 | 103 |
| Comparative Example 5 | Component (H) | 0.5 | Component (K) | 0.5 | 103 | 95 |
| Comparative Example 6 | Component (H) | 0.5 | Component (K) | 0.5 | 105 | 94 |

Combination of the three types of additives reduced the IV resistance value and improved the high-temperature storage performance.

With acyclic carbonates having a low fluorine content, even these additives caused an increased IV resistance value and poor high-temperature storage performance.

INDUSTRIAL APPLICABILITY

The electrolyte solution of the invention can he suitably used as an electrolyte solution for electrochemical devices such as lithium ion secondary batteries.

The invention claimed is:

1. An electrolyte solution comprising:
a solvent that contains a fluorinated acyclic carbonate having a fluorine content of 36.1 to 50.4 mass %;
an organosilicon compound selected from the group consisting tris(trimethylsilyl) phosphate, tris(trimethylsilyl) phosphite, tris(trimethylsilyl) borate, trimethylsilyl fluoride, and triethylsilyl fluoride;
a lithium salt (3) selected from the group consisting of lithium bis(oxalato)borate, lithium difluoro(oxalato) borate, and lithium tetrafluoro(oxalato)phosphate, and
a lithium salt (4) selected from the group consisting of $LiPO_2F_2$, $LiAsO_2F_2$, and $LiSbO_2F_2$,
wherein the electrolyte solution contains 0.001 to 3 mass % of the organosilicon compound, 0.001 to 1 mass % of the lithium salt (3) and 0.001 to 1 mass % of the lithium salt (4), relative to the solvent.

2. The electrolyte solution according to claim 1, wherein the electrolyte solution contains 5 to 85 vol % of the fluorinated acyclic carbonate relative to the solvent.

3. The electrolyte solution according to claim 1, wherein the solvent further contains a fluorinated saturated cyclic carbonate.

4. The electrolyte solution according to claim 3, wherein the electrolyte solution contains 15 to 95 vol % of the fluorinated saturated cyclic carbonate relative to the solvent.

5. The electrolyte solution according to claim 3, wherein the electrolyte solution contains 40 to 100 vol % in total of the fluorinated saturated cyclic carbonate and the fluorinated acyclic carbonate relative to the solvent.

6. An electrochemical device comprising the electrolyte solution according to claim 1.

7. A module comprising the electrochemical device according to claim 6.

8. A secondary battery comprising the electrolyte solution according to claim 1.

9. A module comprising the secondary battery according to claim 8.

\* \* \* \* \*